United States Patent [19]

Nichols et al.

[11] Patent Number: 5,039,038
[45] Date of Patent: Aug. 13, 1991

[54] RAILROAD COMMUNICATION SYSTEM

[75] Inventors: Richard E. Nichols, Melbourne; Hans Scharla-Nielsen, Indian Harbor Beach; Dale H. Delaruelle; Dennis B. Dahlman, both of Melbourne, all of Fla.

[73] Assignee: Harris Corporation, Melbourne, Fla.

[21] Appl. No.: 416,516

[22] Filed: Oct. 3, 1989

Related U.S. Application Data

[62] Division of Ser. No. 143,118, Jan. 12, 1988, abandoned, which is a division of Ser. No. 747,504, Jun. 21, 1985, abandoned, which is a division of Ser. No. 532,147, Sep. 14, 1983, Pat. No. 4,582,280.

[51] Int. Cl.$^5$ .......................... B61L 27/00; B61L 3/00
[52] U.S. Cl. .................... 246/3; 246/187 C; 246/167 R; 340/825.5
[58] Field of Search ......................... 246/3-5, 246/187 C, 187 B, 187 A, 187 R, 182 R, 182 A, 182 C, 182 AA, 182 AB, 167 R, 167 A, 167 D, 28 R, 28 D, 34 R, 133, 134; 340/825.5, 48; 303/20, 15, 3; 105/61

[56] References Cited

U.S. PATENT DOCUMENTS

| 2,907,981 | 10/1959 | Coley | 246/5 X |
| 2,961,640 | 11/1960 | Von Behren | 246/167 R X |
| 3,380,399 | 4/1968 | Southard et al. | 105/61 |
| 3,696,758 | 10/1972 | Godinez, Jr. | 340/48 X |
| 3,767,272 | 10/1973 | Leiber . | |
| 3,957,314 | 5/1976 | Falke | 303/3 |
| 4,093,161 | 6/1978 | Auer, Jr. | 246/187 B X |
| 4,344,138 | 8/1982 | Frasier | 303/20 X |
| 4,582,280 | 4/1986 | Nichols et al. | 246/182 R |

Primary Examiner—Douglas C. Butler
Attorney, Agent, or Firm—Evenson, Wands, Edwards, Lenahan & McKeown

[57] ABSTRACT

A radio communication control system for a lead unit and a plurality of remote units is disclosed. The system has a protocol for establishing a communication link between the lead unit and the one or more remote units in the system which prevents any of the units in that system from processing messages or commands from other units in other train systems or processing messages or commands originating from units within a train system which are addressed to other units within the system. The communication system also includes a communications channel contention system for minimizing the probability of multiple units transmitting on the common communication channel at the same time and for insuring that the highest priority communications in each train are transmitted first in time measured from the end of the latest transmission on the radio communications channel. The invention also includes apparatus for verifying the establishment of the communications link by means of signaling through the mechanical coupling in the train and monitoring the radio response. The invention further includes an improved flow rate sensor for use in a remote unit for determining when significant air flows occur into the brake pipe of the remote unit. The invention further includes an air pressure regulation system which prevents the fluctuation of the air pressure in the equalizing reservoir of the lead and remote units consequent from either leakage or change in the ambient temperature.

4 Claims, 11 Drawing Sheets

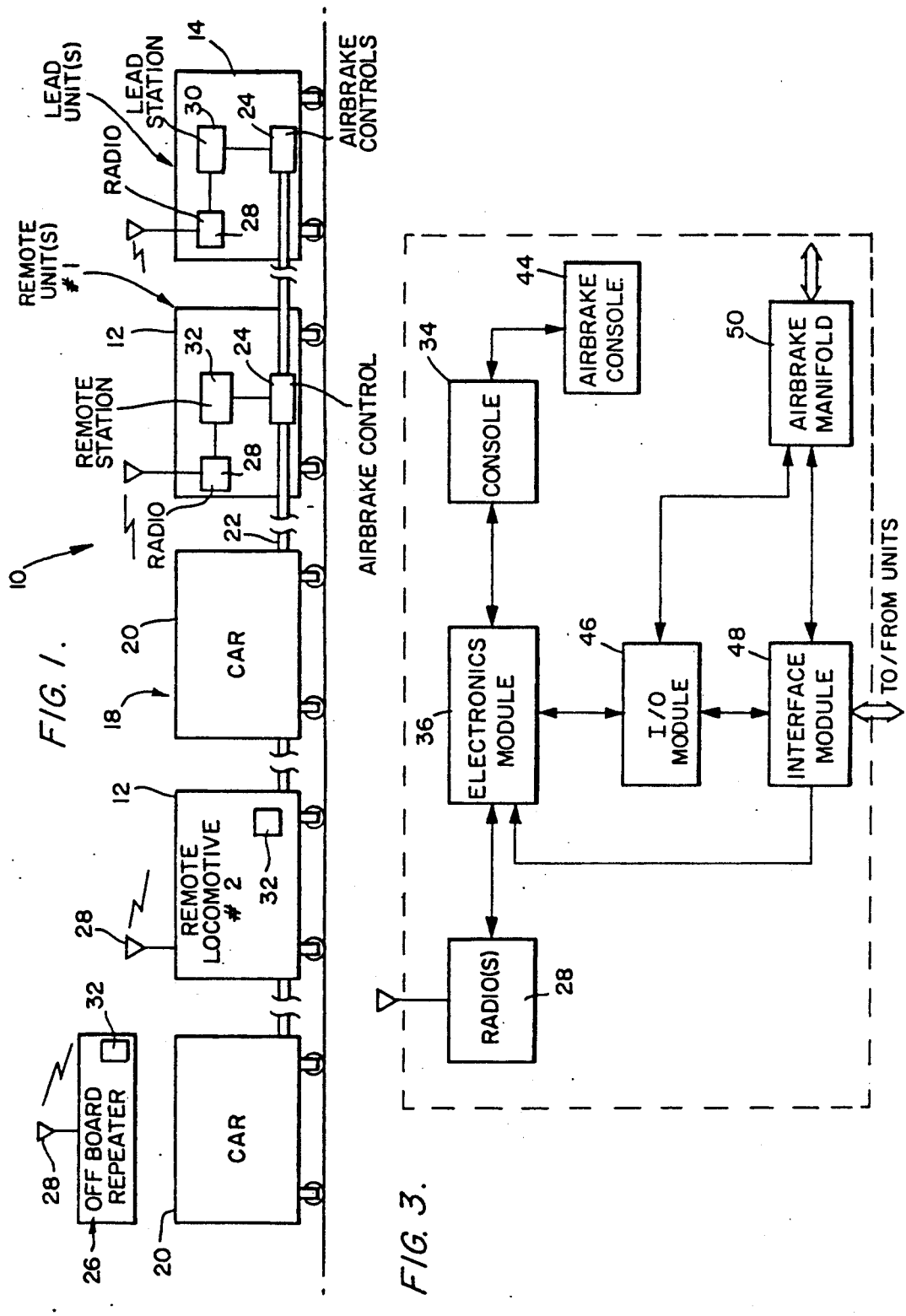

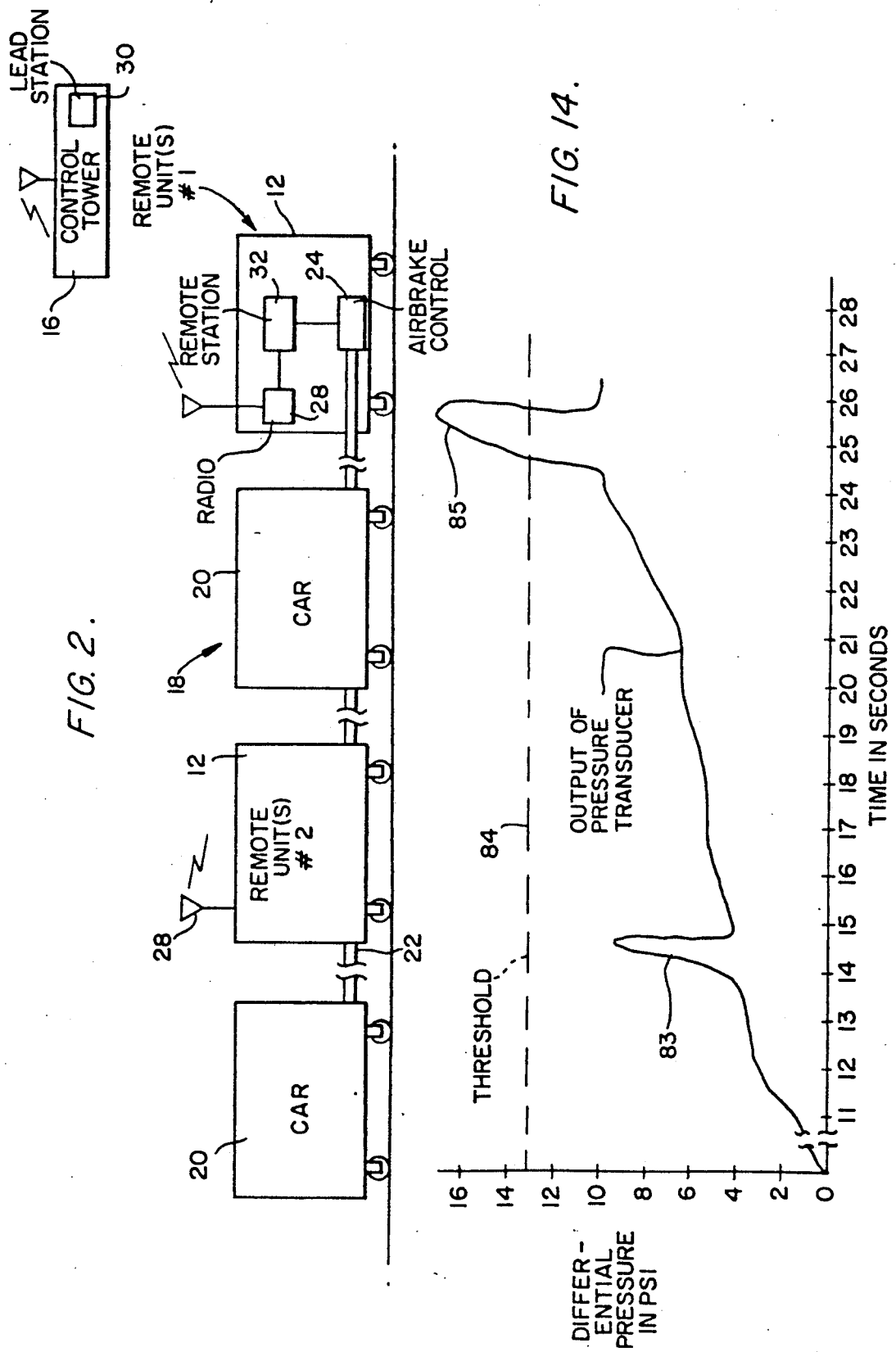

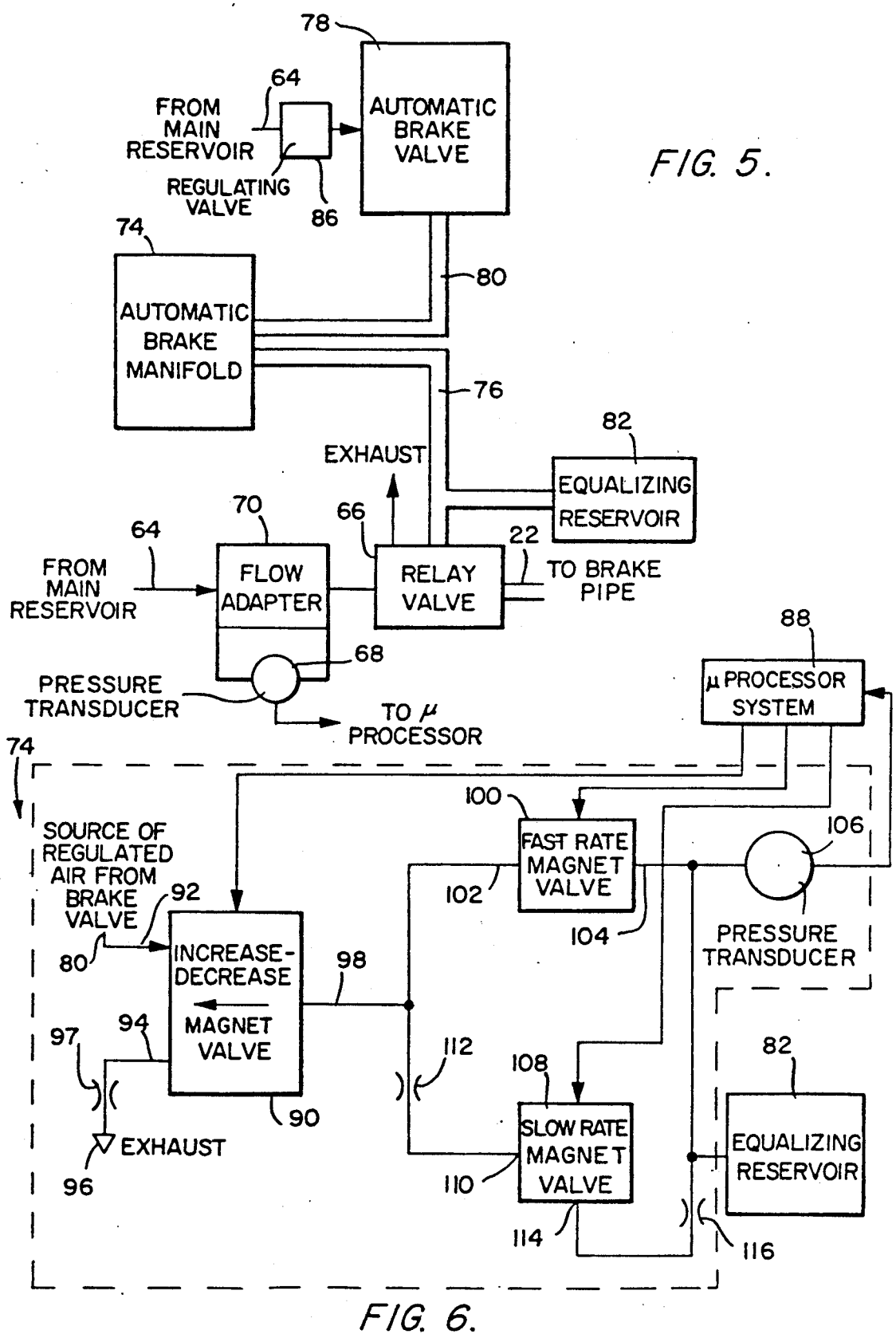

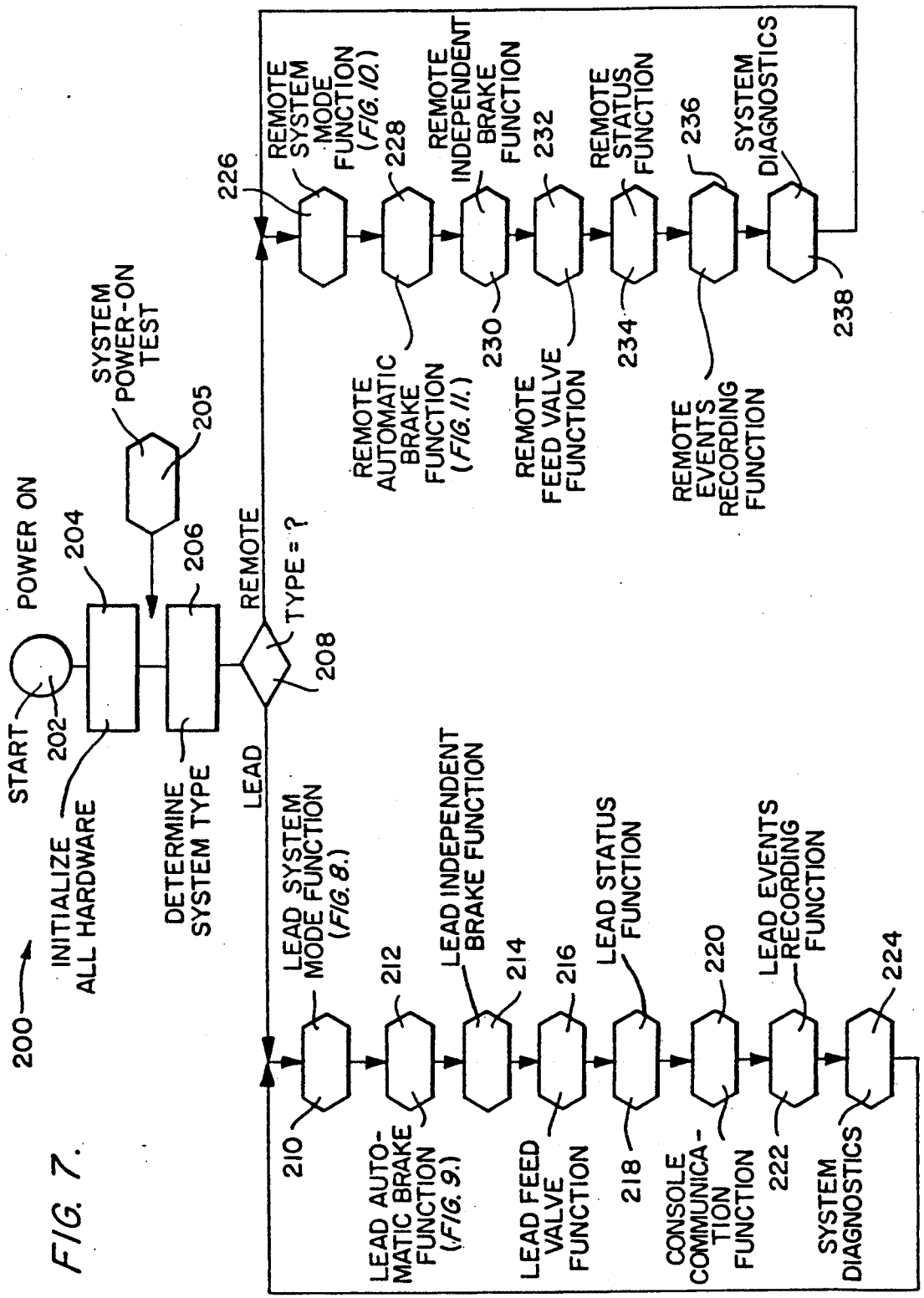

RAILROAD COMMUNICATION SYSTEM

CROSS REFERENCES TO RELATED APPLICATIONS

This is a division of Application Ser. No. 143,118, filed 1/12/88, of Richard E. Nichols et al for RAILROAD COMMUNICATION SYSTEM now abandoned; which in turn is a Divisional application of U.S. Ser. No. 747,504, filed June 21, 1985, now abandoned; which in turn is a Divisional application of U.S. Ser. No. 532,147 filed Sept. 14, 1983, now U.S. Pat. No. 4,582,286.

FIELD OF THE INVENTION

The invention relates to railroad radio communication systems for controlling one or more units or groups of remote units from a lead unit. The invention also relates to air brake systems for use in train having one or more remote units or groups of remote units controlled from a lead unit in which information concerning the air flow into the brake system at the remote units is monitored and analyzed, the result of which is telemetered to the lead unit. The invention also relates to air brake systems for trains which are not susceptible to pressure changes in the brake pipe system caused by temperature variations or leakage.

DESCRIPTION OF THE PRIOR ART

U.S. Pat. No. 3,380,399 discloses a train control system in which a lead unit controls the operation of one or more remote units through communications transmitted between the lead unit and the one or more remote units over a half duplex channel using frequency shift keying (FSK) to serially transmit control information regarding a plurality of functions of the train. In that system, a total of 38 bits of information are transmitted in each half duplex communication. The lead unit and each remote unit store a four bit address code which can be used to define sixteen addresses. The four bit address code is used to determine if radio transmissions should be processed by any receiving unit by matching the address code contained in the received message with that stored at the receiving unit. The use of a single common address does not assure against the remote possibility that other units, in another train in proximity to a receiving unit, are activated by the control information being transmitted to the receiving unit or that information transmitted by a remote unit is processed by the lead unit of another train. The system controls the time that transmissions are made from various units within the same train in accordance with a fixed delay.

Locomotive control systems are presently marketed which utilize the basic concepts described in the U.S. Pat. No. 3,380,399. These systems are improvements of the systems of U.S. Pat. No. 3,380,399. Such systems contain a system for preventing the simultaneous transmission of messages by any one of a plurality of units within one or plural trains within transmitting range of each other. Simultaneous transmissions can at time under specific circumstances lock up the communications channel between various trains within transmitting distance of each other thereby preventing effective command execution which can at times include plural trains in proximity to a train yard. Present systems normally use a 62 ms delay between the time of receipt by a remote unit of transmissions from a lead unit to the time of transmitting a reply by the remote unit transmission to the lead unit. These systems further include a delay time for the lead unit to transmit after the transmission of another unit which is the sum of a one and one half seconds plus an additional time determined from the twelve addressing bits currently used for the addressing of the lead and remote units in a manner analogous to that described above with reference to U.S. Pat. No. 3,380,399. Thus, prior systems, while providing a non-fixed time period between transmissions of different lead units did not contain an overall effective system for accurately controlling when different remote units could reply to transmissions from a lead unit, nor a system having different time intervals for the transmission of various types of messages measured from the end of the last radio transmission. Such systems did not make any provision for assuring the transmission of the highest priority messages first and transmitting messages of lesser priority after the completion of the transmitting of the higher priority messages.

Prior air braking systems for trains having a lead unit which controlled one or more groups of remote units by a radio communication channel monitored the flow of air in a flow adapter located between a main reservoir and a brake valve relay section in the remote units. Two sensors were connected to the flow adapter such that the first sensor sensed the differential pressure across the flow adapter to determine when the pressure drop across the flow adapter was above a maximum level indicative of a significant flow rate requiring idle down of the remove unit wherein idle down is the stepping down of the throttle to idle and cutting out of the air brake feed valve. The flow adapter was coupled to an accumulator. A choke was coupled between the accumulator and the flow adapter. The second sensor, which was a differential pressure switch, was connected across the choke for sensing when the pressure drop across the choke exceeded a threshold. The accumulator functioned to hold the same pressure as the pressure in the flow adapter during steady state conditions. However, a rapid change in the flow rate between the main reservoir and the relay valve causes a differential pressure to be created across the choke which was sensed by the differential pressure switch. Any rapid change in the flow rate (e.g. 5 psi pressure differential) could at times cause the differential pressure switch to trip. Any tripping of the differential pressure switch may be intrepreted as a condition resulting in the unnecessary idle down of the remote unit. The differential pressure switch was mechanical and functioned to produce an indication of any threshold differential pressure greater than its sensitivity during a time interval greater than its response time capability. Effectively, the differential pressure switch functioned almost instantaneously to produce an output signalling a rapid flow rate into the brake pipe. The differential pressure switch was at times susceptible to being tripped by transient conditions such as those that might occur when a train is being pulled out of the yard in the morning under conditions of extreme cold when the various air fittings of the brake pipe are being stressed. These short transient air flows do not warrant the idle down of the remote unit.

Prior air brake system utilized an unregulated equalizing reservoir for sustaining the pressure in the train brake pipe during application of the air brakes. Once the air brakes were applied, the equalizing reservoir was shut off from the pressure regulated main reservoir which left the equalizing reservoir in an unregulated air pressure state. Without application of a regulated source of air to the equalizing reservoir, certain conditions can cause the variation of the pressure in the equalizing reservoir from that which was applied during the initiation of braking. Variation of the pressure in the equalizing reservoir can lead to either the increase or decrease of the braking action from that which was desired. If a train were traveling into a tunnel where the temperature was warmer than the ambient temperature of the equalizing reservoir, the warmer temperature of the tunnel can at times cause heat to flow into the equalizing reservoir to cause a rise in pressure sufficient to tend to cause the brakes to decrease. If the train were going downhill while traveling into the warmer tunnel, the increase in pressure in the equalizing reservoir could be translated by the relay valve into a release of the brakes which could result in a decrease in the ability to properly control the train. If a train was traveling into an area where the ambient temperature was colder than the temperature of the equalizing reservoir, such as a tunnel in the summertime, the pressure in the equalizing reservoir could drop with the flow of heat out of the equalizing reservoir. A pressure drop in the equalizing reservoir could at times cause the brakes to be applied harder which could lead a decrease in the ability to properly control the train within the tunnel. Restarting of the train could require extensive preparations.

SUMMARY OF THE INVENTION

The present invention is a radio control system for trains having a lead unit and one or more remote units or groups of remote control units in which the control functions of the one or more units or groups of remote units are controlled by radio commands from the lead unit. The terminology "unit" as used herein describes both single and groups of diesel-electric units as well as single and groups of electrically driven units and control cars which do not supply driving power to the train and which are used to control units. The radio communication channel between the lead unit and the one or more remote units also signals responses by the remote units to the commands from the lead unit. In addition, alarm conditions which occur in the remote units which should be brought to the attention of the engineer in the lead unit are also sent to the lead unit to insure accurate train operation.

An aspect of the invention is an improved means of communication between the lead unit and the one or more groups of remote units which provides increased communication security over that realizable with the system described in U.S. Pat. No. 3,380,399 and the previous marketd radio communication systems. The radio communication system of the present invention prevents the activating of remote units associated with a particular lead unit by radio communications emanating from a lead unit associated with another train. A functional radio communications link between a lead unit and a remote unit is not established until unique addressing information has been exchanged between the lead unit and the remote unit and comparisons have been made therewith. These exchanges and comparisons greatly reduce the likelihood of an undesired functional communications link being established between a lead unit in one train and a remote unit in another train by the automation of the establishment of the radio communications link which reduces the likelihood of human error. Alternatively, the function of the lead unit may be performed by a control tower when it is desired to control one or more trains from a central location such as in the vicinity of a train yard during train loading and unloading. After the initial establishment of a communications link between a lead unit and a remote unit or tower, all further communications contain different unique addressing information than that used to establish the communications link which further lessens the likelihood of undesired communications occurring between different units.

A further feature of the invention includes the use of the mechanical coupling such as the air brake pipe between the lead unit and the remote unit to assure that a proper communications link has been established as further measure that control of the remote unit is at least in part inhibited unless the mechanical connection has been established or verified. For of the remote units is transmitted via the communications channel to the lead unit. Upon receipt of an acceptable response, the control of lead unit can thereafter be enabled.

A further element of the present invention is designed to optimize the channel use of the same radio carrier frequency by one or more trains within radio communication distance of each other. Interference between multiple trains within radio communication distance of each other is minimized by establishing fixed control time intervals after the ending of the last radio transmission on the radio communication channel for each individual remote unit to reply to a lead unit and a plurality of non-overlapping random time intervals following the initial time intervals for transmitting various categories of commands or alarm conditions on the radio communication channel. The combination of fixed time intervals for remote units to respond to commands from the lead unit and random time intervals for transmitting other information minimizes the probability of more than one unit in the same train or units in different trains from broadcasting on the same channel at the same time. Alternatively, the time intervals for the remote units to reply to a command from a lead unit may be assigned randomly by a random number generator contained in a microprocessor controller of each unit station.

A communication system in accordance with the present invention for use with the control of a railroad train having at least a lead unit and one or more remote units in which the lead unit controls the operation of the one or more remote units with messages which are transmitted by a radio communication message between the lead unit and the one or more remote units and the one or more remote units transmit return messages to the lead unit confirming execution of the lead messages and messages conveying information of the operation of the one or more remote units comprises a plurality of transceivers each adapted for location at a different one of the lead and one or more remote units for transmitting and receiving messages over the radio communication channel; a lead station adapted for location at the lead unit, the lead station having means for storing a first lead identifier which uniquely identifies the lead unit and a plurality of first remote identifiers equal in number to the number of remote units or groups of units, each remote identifier being assigned to each remote unit for uniquely identifying that remote unit and means for generating a common link message for all remote units or individual link messages for single remote locmotives, a link message to be transmitted by the lead unit transceiver for establishing a communication link between the lead unit and any specified one of the one or more remote units over which commands and messages conveying information are to be transmitted, the link message containing the unique first identifier of the lead unit and the first unique identifier of the specified one of the remote units to which the lead unit is to be linked; and one or more remote stations adapted for location at each of the remote units, each remote station having means for storing its assigned first remote identifier and the first lead identifier which uniquely identifies the lead unit, means for comparing any received link message to detect when a received link message contains a first lead identifier and a first remote identifier which agrees with the first lead identifier and first remote identifier stored at the remote station receiving the link message; and means for generating a link reply message to each received link message when the comparison of the received first identifiers and the stored first identifiers by the remote station comparing means is in agreement, the link reply message containing the first lead identifier and the first remote identifier stored at the remote station at which the comparison was in agreement, each remote station means for generating the link reply message being coupled to its associated transceiver for causing transmission of the generated link reply message. The first identifier can, for example, be entered into the communication system as part of the preparation set up sequence or automatically when combining the radio equipment with the unit.

The communication system further includes means located at the lead station for comparing the stored first unique lead identifier and the stored one or more remote first unique identifiers with the first unique lead identifier and the first unique remote identifier contained in any received link message for detecting when the identifiers agree; and means for generating a message for transmission to the remote unit which transmitted the link reply message when agreement of the stored and received first unique identifiers is detected whereby a communication link is established between the lead unit and the remote unit transmitting the link reply message.

Further in accordance with the invention, the lead station means for storing stores a second unique identifier of the lead unit and a second unique identifier of each of the one or more remote units; each of the remote station means for storing stores a second unique identifier of the lead unit with which the remote unit is to be associated and its own unique second identifier, the lead station means for generating a link message includes the stored second unique identifier of the lead unit in the link message; and each of the remote station means for generating a link reply message includes the stored second unique identifier of the remote unit in the link reply message. The second identifier can, for example, be a code that is built into the transmitter portion of the control system.

The lead station of the communication system of the present invention also includes means for generating messages for transmission to any one of the one or more remote units, each message occurring after the establishment of a communication link by the generation of the link message and the link reply message, each message containing the second unique identifier of the lead unit transmitting the message as the only identifier of the lead station transmitting the message; message processing means for processing any commands or messages received from a remote unit; and means for comparing the second unique identifier of a remote unit contained in each message received by the lead unit transceiver with the stored second unique identifier of the one or more remote units and upon agreement of the identifiers coupling the received message to the message processing means located at the lead station.

Each of the remote stations of the present invention further includes means for generating messages for transmission to the lead unit, each message occurring after the establishment of a communications link by the generation of the link message and the link reply message, each message containing the second unique identifier of the remote unit transmitting the message; message processing means for processing any received commands or messages; and means for comparing the second unique identifier of a lead unit contained in each message received from a lead unit with the stored second unique identifier of the lead unit and upon agreement of the lead identifiers coupling the message to the message processing means located at the remote unit station.

The first unique identifier of the lead unit is preferrably a number used to identify the lead unit by a railroad operating the lead unit; the first unique identifier of each of the one or more remote units is preferrably a number used by a railroad operating each of the one or more remote units; the second unique identifier of the lead unit is preferrably a number which is used to identify the lead station; and the second unique identifier of each of the one or more remote units is preferrably a number which is used to identify that remote station. Preferably the second unique identifiers of the lead and remote units are the serial numbers of the respective lead and remote stations.

Alternatively, a second unique identifier of the lead unit and the second unique identifiers of the one or more remote units may be generated respectively by random number generators located at each of the units. The randomly generated second unique identifiers are processed by the system in the same manner as the non randomly generated second identifiers.

Further in accordance with the invention, the lead and one or more remote units may be assigned a common third identifier which is stored by the lead and remote station means for storing; the lead station means for generating a link message includes the stored third identifier in the link message; each of the remote station means for generating a link reply message includes the stored third identifier in the link reply message; the lead station means for comparing compares the stored third identifier with the third identifier in any link reply message to detect when the third identifiers agree; the remote station means for comparing compares any received link message to detect when a received link message contains a third identifier which agrees with the third identifier stored at the remote unit receiving the link message; and the remote station means for generating the link reply message to each link message generates the link reply when the remote unit means for comparing signals that all of the stored and received identifiers agree. Preferably, the third identifier is an eight bit version code which is used to distinguish different message formats associated with types of operation, e.g. diesel or electric unit operation.

The present invention also includes lead and remote stations which are used in the above described communication system.

The present invention includes a system for controlling which unit transceiver transmits on the radio communication channel. The transmission control system includes means adapted for association with each transceiver in the system for detecting the ending of a transmission on the channel by any transceiver; and means adapted for association with each of the transceivers which is responsive to an associated means for detecting for controlling the initiation of a transmission after the ending of a previous transmission. Each of the one or more remote transceivers is assigned a time interval measured from the end of the latest transmission for initiating a reply to any lead unit transmission, each time interval for the transmission by the remote units being non-overlapping with the time interval for the other remote units. Alternatively, each remote station may be assigned a time interval for initiating a reply to any lead unit transmission by a random number generator.

Further in accordance with the system for determining transmission on the radio communication channel, one of the remote units functions as a first repeater for receiving a transmitted message from the lead unit and retransmitting that message; and the repeater is assigned a time interval measured from the end of the latest transmission for repeating the transmission by the lead unit which is identical to one of the time intervals of the remote units for transmitting replies to transmissions from the lead unit or the reply message from the remote.

A system for controlling which unit transmits on the radio communication channel further includes a transceiver associated with a second repeater adapted for a location off of a train for receiving a transmission from a lead unit and retransmitting that transmission and wherein the means adapted for association with the transceiver of the second repeater for controlling the initiation of transmission by the second repeater is assigned a time interval for repeating the transmission which does not overlap the time intervals of the remote units for transmitting replies to transmissions from the lead unit and follows the time interval of the first repeater for initiating retransmission of a transmission of the lead unit or the remote unit reply message.

Further in accordance with the system for controlling which unit transmits on the radio communication channel, a plurality of time periods are assigned for transmitting different groups of commands after the latest transmission on the radio communication channel. The actual time of transmission of a command within each of the time periods is assigned randomly by a random number generator.

The present invention is an apparatus for measuring air flow rate between a main reservoir and a relay valve in a remote unit. The apparatus for measuring air flow rate is used in a train having at least a lead unit, one or more remote units and a plurality of cars which are provided with air brakes, the remote units each having an equalizing reservoir for providing a pressure reference for air brake control and a relay valve in communication with the equalizing reservoir for applying pressurized air equal in pressure to the air pressure in the equalizing reservoir to a brake pipe coupled to the air brakes for the activation and deactivation of the air brakes of the plurality of cars; a main reservoir of air coupled to each relay valve for charging the brake pipe with air; and means disposed between the main reservoir and the relay valve for sensing the rate of flow of air between the main reservoir and the relay valve. The apparatus for analyzing flow rate between the main reservoir and the relay valve comprises means for measuring the pressure drop across the means for sensing flow rate, the means for measuring having a response time for sensing any change in pressure drop; and means for analyzing the pressure drop over a time interval longer than the response time to detect a characteristic of the pressure drop as a function of time which is indicative of a flow rate change across the means for sensing. The means for analyzing detects when the pressure drop across the means for sensing flow rate exceeds a predetermined threshold pressure. The means for analyzing can utilize different methods of analysis of the pressure drop over the time interval. These methods, without limitation of the invention thereto, may (1) integrate the change in pressure drop as a function of time from the beginning of the time interval to the end of the time interval and signal when the value of that integration exceeds a threshold; (2) average the rate of change of pressure drop from the beginning of the time interval to the end of the time interval and signal when the value of that average exceeds a threshold; and (3) average the rate of change of the pressure drop during a plurality of sub time intervals within the time interval, and signal when a predetermined number of the averages during the sub time intervals consecutively exceed a threshold.

The apparatus for analyzing flow rate between the main reservoir and the relay valve may be used in an air brake system for a train having a communication channel in which each of the remote units are controlled from the lead unit and each of the remote units transmits messages to the lead unit in response to commands and to the occurrences of alarms in the remote unit. Each remote unit has a transceiver; and means coupled to each of the means for analyzing flow rate for causing the remote transceiver to signal the lead unit transceiver when either (1) the pressure drop exceeds the predetermined threshold pressure drop or (2) the analysis of the pressure drop over a time interval exceeds a predetermined threshold.

BRIEF DESCRIPTION OF THE DRAWINGS

FIG. 1 is a system schematic view of a train utilizing the present invention.

FIG. 2 is a system schematic of a modification of the system of FIG. 1.

FIG. 3 is a schematic view of an individual station used in the system of FIGS. 1 and 2.

FIG. 5 is a schematic of the flow rate analyzing apparatus of the present invention.

FIG. 6 is a schematic of the pressure regulated equalizing reservoir of the present invention.

FIG. 7 is a flow chart illustrating the organization of the various subroutines which the microprocessor controller executes in the present invention.

FIG. 14 is a diagram illustrating the response of the pressure transducer of FIG. 5 as a function of time.

DESCRIPTION OF THE PREFERRED EMBODIMENTS

I. General System Description

Figure 4:
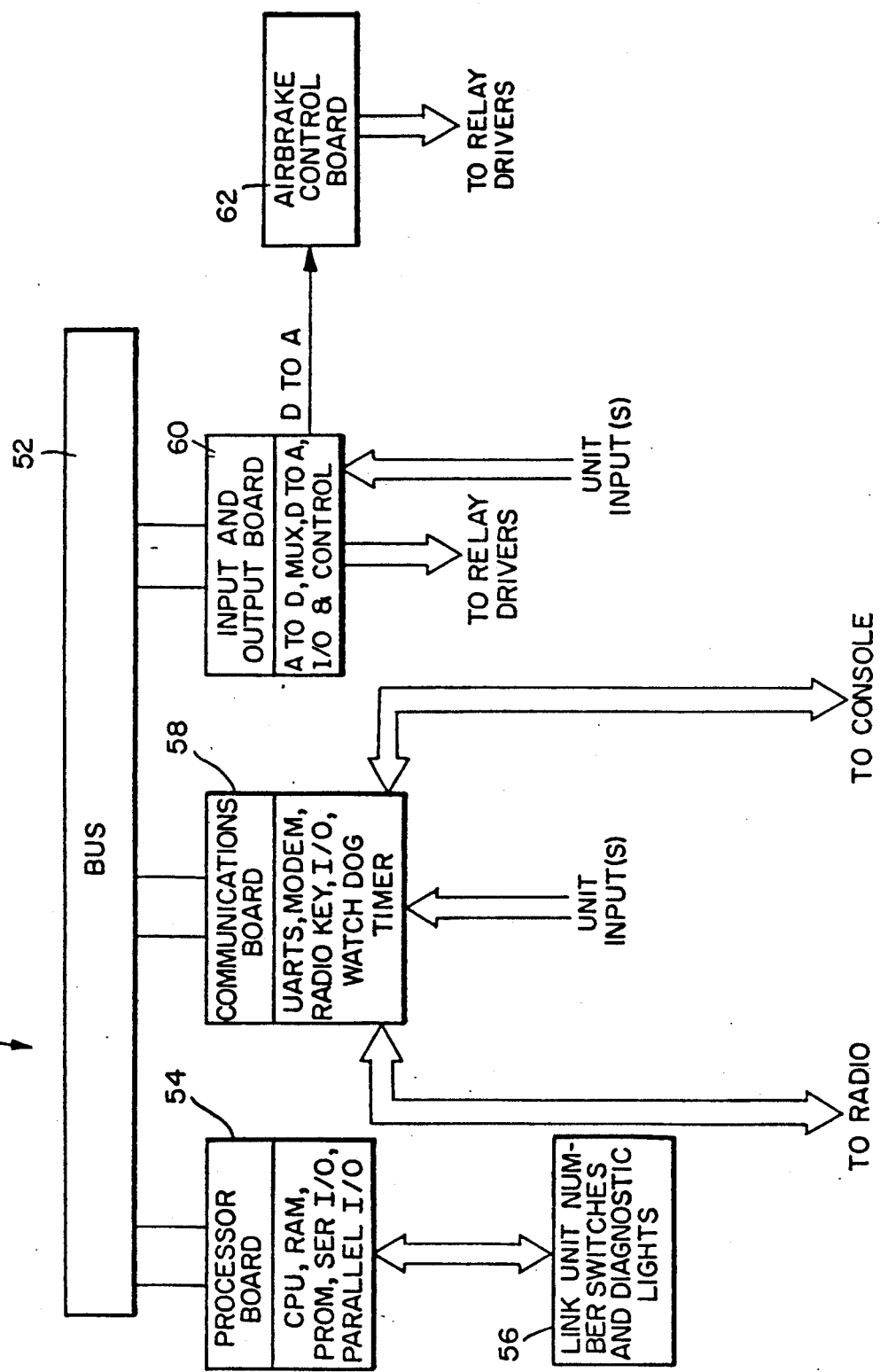
FIG. 4 is an electrical schematic of the electronics module of FIG. 3.

FIGS. 1 and 2 schematically illustrate a communication system 10 which is used for controlling one or more remote units 12 from either a lead unit 14 (FIG. 1) or control tower 16 (FIG. 2) with a single FM half-duplex communication channel having a three kHz band width. The individual radio transmission contain a serial binary code which has been FSK encoded. The details of the control functions and the transmission format of individual messages are discussed in detail infra in section V. It should be understood that the only differences between the systems of FIGS. 1 and 2 are that the function performed by the lead unit 14 of FIG. 1 is replaced by the control tower 16 in FIG. 2 and certain interlocks of the system of FIG. 1 are eliminated. Specifically there interlocks are (1) the usage of a lead unit first unique identifier, (2) the requirement for a five psi rise in brake pipe pressure to permit feed valve cut in, (3) the elimination of the brake pipe continuity test, (4) the communications interruption time interval is shortened from 45 seconds to 30 seconds and (5) communications interruption results in a full automatic brake application in addition to idle down of the remote unit. Additionally, the control tower is not assigned a first unique identifier, but is assigned the second unique identifier. Hereinafter, the term lead station 30 is used to describe both the lead station 30 in the lead unit 14 of FIG. 1 and the lead station 30 of the control tower 16 of FIG. 2. The train 18 has in addition to the lead unit 14 and one or more remote units 12, a plurality of cars 20 which separate the lead unit from the remote unit #1 and the remote unit #1 from the remote unit #2. The cars 20 are provided with an air brake system which functions to apply the air brakes upon a pressure drop in the brake pipe and to release the air brakes upon a pressure rise. The details of the air brake system are described infra in section IV. The individual cars 20 are coupled together by a brake pipe 22 which conveys the air pressure changes specified by the individual air brake controls 24 in the lead unit 14 and the remote units 12. An off board repeater 26 may be disposed within radio communication distance of the train 18 for relaying communications transmitted between the lead unit 14 and one of the remote units 12. The off board repeater 26 would typically be used in a situation where direct communications between the lead unit 14 and the remote units 12 are hampered such as while the train 18 is within a tunnel. The lead unit 14, the remote units 12 and the off board repeater 26 and the control tower 16 are provided with a transceiver 28 which functions to receive and transmit the FM communications on the half duplex communications channel. The lead unit transceiver 28 is associated with a lead station 30 which contains the electronics for the control of the remote units 12 by the lead unit 14. Each of the remote units 12 and the off board repeater 26 has a remote station 32 which contains the electronics for responding to the transmissions of the lead station transceiver 28. Both the lead station 30 and the remote stations 32 are added on to the conventional unit. Additionally, the roles of the lead station and remote station may be interchanged by the selection of an appropriate control made on the control console 34 (FIG. 3) of the lead station 30 and the control console of one of the remote stations 32. The controls on the control console 34 are not illustrated. Each of the unit control consoles 34 is coupled to an associated air brake console 44 (FIG. 3). The lead station 30 and the remote station 32 each include an air brake control 78 (FIG. 5) which controls the train air brakes. The details of the lead station 30 and the remote station 32 are described infra with regard to FIG. 3. It should be understood that the air braking system used with the invention as illustrated in FIGS. 1 and 2 is of conventional design with the exception of the subject matter described infra with regard to FIGS. 5 and 6.

II. General Description of Security System

The present invention provides a security system which prevents units associated with different trains from communicating with each other and units in the same train from communicating with each other when in fact communication with another unit in the same train was desired. The security system utilizes two unique identifiers and a third common identifier for each of the lead unit 14 and the one or more remote units 12 during the establishment of the communication links between the lead unit and the remote units. The security system also includes a verification scheme via the train mechanical coupling between the lead unit 14 and the one or more remote units 12. The sequence of establishing communications links between the lead unit 14 and each of the one or more remote units 12 is described hereinafter in conjunction with the "link" and "link reply" messages. Each of the stations 30 and 32 stores the first and second unique identifiers which identify the unit with which that station is associated and the unique code assigned to that station. The stations 30 and 32 also store the common third identifier which may be referred to as a version code and preferrably is used to identify different message formats associated with different types of train operation such as diesel or electric. The first unique identifier is preferably the four digit number assigned by the railroad to identify a unit and is typically visible to the engineer operating the unit. The second unique identifier is preferably the serial number of the lead station 30 when a lead unit is being identified and is preferably the serial number of the remote station 32 when a remote unit is being identified. The lead station 30 initiates the establishment of a communications link between the lead unit 14 and one of the remote units 12 by the transmission of a link message. The link message contains the first and second unique identifiers of the lead unit 14 and the first unique identifier of the remote unit 12 to which the lead unit wishes to link for establishing a communication link and the version code. The remote unit 12 to which the lead unit 14 wishes to link receives the transmitted link message and compares the transmitted first unique identifiers of the lead unit and the remote unit and the transmitted version code with the stored first identifiers and the stored version code to determine if they agree. If the first identifiers and the version code do not agree, the receiving remote station 32 does not consider the transmitted message to be a request to create a communications link with the lead unit transmitting the link message. If the comparison of the first unique identifiers and the version code contained in the link message agrees with those stored at the receiving remote station 32, the receiving remote station saves the second unique identifier which was transmitted as part of the link message for its use later on as the addressing mechanism for transmitting messages to the lead unit 14. After all of the required comparisons have been made at the receiving remote station 12, the remote station transmits a link reply message which contains the first identifiers of the transmitting remote unit and the lead unit to which the link reply message is to be transmitted and the version code. The link reply message also contains the second unique identifier of the remote station 32 transmitting the link reply message. The lead unit 14 compares the first identifiers contained in the link reply message with the first identifiers stored in the storage of the lead station 30 and the transmitted version code with stored version code. If there is agreement between the transmitted first identifiers, and version code with the stored first identifiers and version code, the storage of the lead station 32 stores the second unique identifier contained in the link reply message for use as the address of the remote unit 12 transmitting the link reply message. All future communications between the lead unit and that remote unit 12 use the second unique identifier to determine if received messages are transmitted from that remote unit. After the storage by the lead station 30 of the second unique identifier contained in the link reply message, confirmation of the establishment of the communication link is signaled when the lead unit 14 transmits a command to that remote unit 12 which occurs a minimum of every twenty seconds.

As a further feature of the security system, the lead unit can signal the remote units via the mechanical coupling to verify, through the physical connection, that the remote units are properly linked for communication. More specifically, the lead unit 14 can signal, the remote unit 12 via an air brake connection in the mechanical coupling. The signal can, for example, be an increase, or decrease in air pressure, or perturbations in air pressure, although for this specific example a decrease in the air pressure is preferred. The remote station 32 is adapted to detect such signal and send a message, along with the appropriate identifier to the lead unit. If all remote stations do not reply within a specified time, the lead and/or remote locomtives are inhibited from using the remote unit as part of the power drive for the train.

III. Stations

FIG. 3 illustrates a schematic view of one of the stations 30 or 32 which are interchangable in function by the activation of a suitable control (not illustrated) on the console 34 of the station. The console 34 contains a plurality of controls and alarms, which are controlled by programmed microprocessors located in each station. Each station has a transceiver 28 which receives communications on the FM communication channel and transmits communications originating with the unit with which the station is associated. The transceiver is coupled to an electronics module 36 which is illustrated in detail in FIG. 4. The station console 34 is coupled to an air brake console 44 which contains the controls for various air brake controls used on units. An input-output module 46 is coupled between the electronics module 36 and an interface module 48. The interface module 48 is coupled to an air brake manifold 50. The interface module functions to convey signals between the air brake manifold 50 and the electronics module 36 for processing by the microprocessor located in the electronics module and for transmission to the console 34 for display.

FIG. 4 illustrates a schematic of the electronics module 34 of FIG. 3. The electronics module includes a data bus 52 which functions to transmit digital communications throughout the electronics module. A processor board 54 is coupled to the data bus. The processor board 54 includes the programmed microprocessor which controls the system. Preferably, the microprocessor is a National Semiconductor Corporation NSC 800. The processor board 54 also includes random access memory (RAM), programmable read only memory (PROM), serial input-output capability and parallel input-output capability. The serial input-output capability is used for printing maintenance data. A panel 56 for a remote unit is provided, which contains the unit number switches for storing the number of the lead unit to which the remote unit containing the station is to be linked, and various diagnostic indicators. For a lead unit, switches and indicators are provided on a console for setting the number(s) of the remote units to which the lead unit containing the station is to be linked. The unit number in the lead unit switches may be manipulated by the engineer who is operating the lead unit 14 and in the remote units 12 by the personnel setting up each of the remote units for linking to the lead unit. The PROM stores the second unique identifier of the station with which it is associated. The PROM also stores the third identifier which is the common version code. The version code is preferably an eight bit number used for differentiation between different message formats associated with different types of operation such as diesel and electric primary power, etc. The data bus 52 is also coupled to a communications board 58 which includes a plurality of UART's (Universal Asynchonous Receiver Transmitter) a modem, radio keying circuitry for controlling the FM carrier, input-output, and watch dog timers which are used for various processor and system activities. The communications board is coupled to an associated transceiver 28 and to the console 34 and receives inputs from the unit to which the station is associated. The bus 52 is also coupled to an input-output board 60. The input-output board includes an A to D converter, a multiplexer, D to A converters and parallel input, and/or outputs. The input-output board 60 receives inputs from the unit and supplies outputs to relay drivers, to electric brakes, and to the air brake control board 62 and other control items. The air brake control board 62 is coupled to relay drivers.

IV. Air Brakes

The following air brake functions are present in the air brake system of the train 18 in FIG. 1.

A. Feed Valve

The remote automatic brake charging and venting is controlled via a remote feed valve function. The feed valve is cut in by:
1. Placing the system in a mode other than isolate mode.
2. Pressing the feed valve in button (not illustrated) on the air brake console 44.
3. Pulling the automatic release button (not illustrated) on the air brake console 44.
4. Charging begins after a 5 psi rise in remote brake pipe pressure is sensed.

The remote feed valve may be cut out by moving a mode rotary switch to the isolate position.

The feed valve control signal is a binary pneumatic output at the remote units 12.

B. Automatic Brake

Lead unit and remote unit automatic air brake functions are controlled from the air brake console 44. An automatic brake application is initiated by pressing the automatic application button (not illustrated) on the air brake console 44. The pressures in the lead and remote equalizing reservoirs 82 are reduced equally so long as the button is pressed. The minimum reduction is 7 psi for a first reduction and is 2 psi after the first reduction.

An automatic release is initiated by pulling the automatic release control on the air brake console 44. This causes the lead unit equalizing reservoir pressure to increase to the pressure set by the lead automatic air brake regulating valve 86 (FIG. 5). The remote unit equalizing reservoir similarly increases to the pressure set by its regulating valve. The automatic release function also releases emergency applications.

The automatic brake control signal is an analog pneumatic output at the lead and remote units. A binary pneumatic output and pressure switch performs the emergency reset function at the lead and remote.

C. Independent Brake

Lead unit independent brakes are controlled from the air brake console 44 and from the lead unit independent brake valve (not illustrated). The lead unit brake cylinder pressure will be equal to the greater of the two control pressures. The remote unit independent brakes are controlled from the lead unit air brake console 44.

An independent brake application is initiated by pressing the independent application button (not illustrated) on the air brake console 44. This causes the independent brake control pressure at the lead and remote units to increase, so long as the button is pressed.

An independent brake release is initiated by pressing the independent release button on the air brake console 44. The lead and remote unit independent brakes are reduced to zero and an actuating pipe is momentarily pressurized. The independent brake valve may be used to override a pushbutton independent release at the lead unit.

The independent brake control signal is an analog pneumatic output at the lead and remote units. The independent actuating signal is a binary pneumatic output at both the lead and remote units.

D. Emergency Brake

An emergency brake application can be initiated in any of three methods:

1. Pressing the emergency button (not illustrated) on the air brake console 44. This causes electric valves to operate at the lead and remote units which cause the braking action.
2. Causing a brake pipe emergency at the lead unit. This is sensed by a pressure switch connected to the A-1 charging cut-off pilot valve (not illustrated). The electric valves at the lead and remote units operate as above.
3. Pressing the emergency button on the air brake console 44. A manual valve in the console initiates a brake pipe emergency which is sensed and propagated as in (2) above.

An emergency application is released by pulling (unlatching) the button, then after three minutes pulling the automatic release button.

An emergency application sensed at the remote unit is reported by the communications channel to the lead unit but not duplicated there.

A major system failure or battery power interruption results in a emergency brake application and automatic unlinking described infra in the section V.

In the unlinked mode, all remote control functions are disabled, and the emergency brakes are applied.

The emergency brake control signal is a binary pneumatic output at both the lead and remote units. The brake pipe emergency status signal is a binary pneumatic input at both units.

E. Air Brake Function Interlocks

Interlocks are included in the air brake control system to protect against improper operation.

1. Feed Valve Sequencing:
   To cut in the remote feed valve, a mode select switch (not illustrated) is set in the isolate position. It is put in isolate when the feed valve in button on the system console 34 is pressed and then the automatic release switch on the air brake console 44 is pulled. The feed valve is cut in following a 5 psi rise in brake pipe pressure.
   The remote feed valve is cut out by, setting the mode switch on the system console to the isolate position.
2. Minimum Automatic Reduction:
   The minimum initial automatic reduction is 7 psi. The minimum additional reduction is 2 psi.
3. Minimum Brake Pipe Pressure:
   To prevent the loss of emergency brake capabilities, an automatic application below 45 psi is not allowed. If a reduction of brake pipe pressure below 45 psi is attempted, an emergency application is initiated by the system.
4. Automatic application/communication check interlock with override:
   If the system includes override capability, a heavy brake application is required to idle down the remote unit following a communication interruption. Any automatic brake application under these conditions is converted to a 10 psi (minimum) application.
   If no remote reply is received within 5 seconds of an automatic application, a 10 psi application is generated by the system.
5. Automatic Application/Remote Changing flow display:
   If an automatic brake application is made before the remote has fully re-charged the brake pipe (as determined by the air flow rate), an air flow display (not illustrated) flashes and air audible alarm pulses occur.
6. Automatic Application/Remote Changing interlock option:
   If an automatic brake application is made before the remote has fully re-charged the brake pipe 22 (as determined by the air flow rate FIGS. 5), the system adjusts the equalizing reservoir pressures at both lead and remote units to assure an effective brake. These pressures are set such that the brake application at the remote is the application requested by the operator. This results in a heavier "effective" brake at the lead.

FIG. 5 illustrates the aspect of the present invention which senses the air flow between a main reservoir 64 and a relay valve 66 by a differential pressure transducer 68 which is coupled across a flow adapter 70 that is disposed between the main reservoir and the relay valve. The flow adapter 70 is a choke having reduced diameter compared with the conduits coupling the one side of the flow adapter to the main reservoir and the other side of the flow adapter to the relay valve 66. The differential pressure transducer 68 produces an analog output voltage which is coupled to the microprocessor contained within the processor board of FIG. 4. The analog output signal of the pressure transducer 68 is converted to digital format and processed by the microprocessor. The microprocessor detects differential pressures which exceed a maximum threshold value under even transient conditions and performs an analysis over a time period longer than the response time period of the pressure transducer for determining abnormal flow conditions indicative of significant air flows into the brake pipe 22. The particular types of analysis performed by the microprocessor over a time interval longer than the response time of the pressure transducer 68 may be in accordance with any known averaging technique which eliminates the shutdown of a train solely in response to transient conditions having a magnitude less than the aforementioned maximum threshold value. The function of the pressure transducer 68 is also discussed infra with regard to FIG. 14. An automatic brake manifold 74 is coupled to the relay valve 66 by a conduit 76. The automatic brake manifold 74 is also coupled to an automatic brake valve 78 via conduit 80. The automatic brake valve is coupled to the main reservoir 64 via a regulating valve 86. An equalizing reservoir 82 is coupled to the relay valve 66. The equalizing reservoir 82 functions to translate pressure drops and rises commanded from the lead unit 14, by activation of valves in the automatic brake manifold 74 (FIG. 6), to the relay valve 66 which applies the pressure of the equalizing reservoir 82 to the brake pipe 22 to maintain desired braking action. In the prior art air brake system, the application of an automatic brake command by the automatic brake valve 78 or brake manifold decoupled the equalizing reservoir 82 from a source of pressure regulated air which permitted the pressure of the equalizing reservoir to vary as a function of the ambient temperature of the equalizing reservoir and from leaks in the equalizing reservoir.

FIG. 14 illustrates a typical output of the differential pressure transducer 68 of FIG. 5 as a function of time. The programmed microprocessor analyzes the pressure drop across the flow rate adapter 70, which is outputted by the pressure transducer 68 over a time interval longer than its response time to detect a characteristic of the pressure drop as a function of time which is indicative of a flow rate change across the flow rate adapter. The microprocessor is programmed using conventional programming techniques which do not constitute part of the invention. Whenever (including transients) the differential pressure exceeds the threshold identified by reference numeral 84, the microprocessor program immediately produces a flow rate alarm signal. This maximum pressure threshold 84 is indicative of a high rate of flow from the main reservoir 64 into the relay valve 66 which constitutes a condition requiring idle down. The transient 83, which is below the threshold 84 will not activate the flow rate alarm when the time average is above a second threshold. A transient 85 above the maximum threshold pressure 84 does not have to be present for any period of time to trigger the flow rate alarm signal and to cause an immediate idle down.

The microprocessor is also programmed to analyze the output of the pressure transducer 68 over a period of time which is longer than the response time of the pressure transducer. The analyses performed by the microprocessor signals when a non-transient flow rate condition of air from the main reservoir 64 into the relay valve 66 exists with a magnitude below threshold 84 but with sufficient duration to require idle down. The invention is not limited to any particular mathematical analysis technique for analyzing the output of transducer 68 as a function of time. A first form of mathematical analysis which may be used to analyze the output of the pressure transducer is to integrate the area underneath the curve traced by the output of the pressure transducer from the beginning of an analysis time interval (12 seconds in FIG. 14) to the end of the analysis time interval (28 seconds in FIG. 14). Preferably with the present invention, but not limited thereto, a sixteen second time interval is used as an integration time basis. When the value of the integration over the sixteen second time interval exceeds a second threshold, the microprocessor signals the presence of a condition requiring idle down. In situations where trains are leaving railroad yards early in the morning under low temperature conditions, it is common for jolting caused by the starting of the cars to produce transients in the brake pipe 22 consequent from the couplings being moved with respect to each other. With the prior art system which was only sensitive to the absolute magnitude of the differential pressure across the pressure transducer, cold conditions would at times cause undesired idle down. The present invention averages transients with the remainder of the output of the differential pressure transducer 68 by analyzing the output of the pressure transducer over a period of time longer than the response time of the pressure transducer. The microprocessor in the remote unit 12 is programmed to cause its associated transceiver 28 to signal the lead unit 14 that a significant flow of air is occurring into the brake pipe 22 from the main reservoir at the remote unit.

In addition, the communications channel between the remote units 12 and the lead unit 14 may be used as a mechanism for checking the continuity of the brake pipe 22 at the initiation of operation of the train 18. The continuity check is performed by applying the air brakes at the lead unit without air brake application at the remote unit and determining if the remote unit senses a significant flow rate of air through the flow adapter 70 within 20 seconds of the application of the brakes by the lead unit. If the application is not sensed, the remote unit 12 will not transmit a significant brake flow alarm which signals the engineer in the lead unit 14 that the brake pipe 22 does not have continuity and that the remote unit 12 cannot be operated to power the train.

As an alternative to the integration of the output of the differential pressure transducer 68, the microprocessor may be programmed in accordance with known programming techniques to arithmetically average the differential pressure over a period of time larger than the response time of the differential pressure transducer for calculating a numerical value which may be used to indicate whether or not a significant flow rate exists from the main reservoir 64 to the relay valve 66 which is not susceptible to being erroneously exceeded by transient conditions.

As another alternative to the integration of the output signal from the differential pressure transducer, the output of the differential pressure transducer may be averaged over a plurality of subtime intervals within a larger time interval of analysis to signal when a predetermined number of the averages during the subtime intervals consecutively exceed a threshold. This analysis, like the two preceeding analysis is not subject to being erroneously affected by transients.

Thus in accordance with the present invention the effects of transient conditions which do not require remote idle down of the air brakes are eliminated which has been a problem with the prior art mechanical pressure transducers which analyzed flow rate. Moreover, the ability to analyze the flow rate from both an absolute maximum pressure differential and a lower time averaged pressure differential provides the train control system with the ability to differentiate response to those conditions which require the instantaneous initiation of idle down and the initiation of idle down after an analysis for a period of time.

FIG. 6 illustrates the details of the automatic brake manifold 74 of FIG. 5 which in conjunction with the microprocessor control system functions to maintain a specified equalizing reservoir pressure consequent from the activation of the air brake console controls 44 by the engineer in the lead unit 14. An automatic brake application is initiated by pressing an automatic application button within air brake console 44 of FIG. 3 which causes operation of magnet valves which are described below. The pressures in the lead unit and remote unit equalizing reservoirs 82 are reduced equally as long as the automatic brake application button is pressed for more than 1.5 seconds. The first reduction is 7 psi which is caused by activation of the automatic valve up to 1.5 seconds and the reductions thereafter are 2 psi (minimum) per step. The lead unit 14 automatic brake function is discussed infra with regard to FIG. 9 and the remote automatic brake function is discussed infra with regard to FIG. 11. The equalizing reservoir pressure regulating valve 86 is part of the automatic air brake control value. The equalizing reservoir pressure regulating valve 86 is coupled to microprocessor 88 via a pressure transducer 106 in the automatic brake manifold 74. A magnet valve 90, which has a first input port 92 coupled to the brake valve, a second input port 94 coupled to the atmosphere 96 by choke 97 and an output port 98, functions to selectively apply input pressurized air from the brake valve or exhaust air through the output port. A fast rate magnetic valve 100 has an input port 102 coupled to the output port 98 of the solenoid valve 90 and an output port 104 coupled to pressure transducer 106 and the equalizing reservoir 82. The pressure transducer 106 is coupled to the microprocessor 88 for providing the microprocessor with the pressure of the equalizing reservoir 82. A slow rate magnetic valve 108 has an input port 110 which is coupled to the output port 98 of the magnet valve 90 via a choke 112 and an output port 114 coupled to the equalizing reservoir via choke 116. The chokes 112 and 116 function to reduce the flow rate through the slow rate magnetic valve 108 below the flow rate into the fast rate magnetic valve 100. Preferably, the slow rate magnetic valve is the only one of the magnetic valves activated when a comparison of the desired pressure in the equalizing reservoir and the actual pressure read by the pressure transducer 106 by the microprocessor is less than plus or minus 1.0 but greater than + 0.2 psi. When the difference between the pressure read by the pressure transducer 106 and the specified air pressure is greater than plus or minus 1.0 psi, both the fast rate magnetic valve 108 and the slow rate magnetic valve 100 are opened. The pressure regulator of FIG. 6 functions under the program control of the microprocessor 88 to apply the air from the brake valve via the magnet valve 90 to the equalizing reservoir when the pressure read by the pressure transducer 106 is less than the pressure commanded by the automatic brake valve 78 and couples the atmospheric pressure 96 to the equalizing reservoir 82 when the pressure read by the pressure transducer 106 is greater the pressure commanded by the automatic brake valve. The magnitude of the pressure differential is analyzed as described above to selectively activate either the slow rate magnet valve 108 alone when the error is less than +1.0 psi but greater than 0.2 psi or the combination of the slow rate magnet valve 108 and the fast rate magnet valve 100 when the pressure differential between the pressure dictated by the automatic brake valve and that read by the pressure transducer 106 is greater than +1.0 psi. As has been discussed above with reference to the prior art, an unregulated equalizing reservoir is subject to thermal variation caused by ambient temperature conditions. When a train goes from a cold area to a warmer area such as a tunnel, the resultant pressure rise in the equalizing reservoir 82 caused by the thermal absorption of energy from the warmer interior of the tunnel could cause a degraded braking operation when the tunnel has a downhill grade. Alternatively, the entrance of the train into a tunnel in a summertime condition when the tunnel would be cooler than the exterior of the tunnel may produce a pressure drop in the equalizing reservoir 82 consequent from the thermal flow of heat from the equalizing reservoir which could cause an automatic braking of the train requiring the units to work against the increased braking force being applied by the air brakes or in the extreme cause the train to stop which requires extensive preparation for restarting the train. The regulated equalizing reservoir of the present invention eliminates these problems and provides for the maintenance of the desired air pressure in the equalizing reservoir substantially independent of thermal conditions or leaks.

V. Communications

The four main types of radio communications in the system are (1) link message, (2) link reply message, (3) commands from the lead unit 14 requesting control functions in the one or more remote units 12 and (4) status and alarm messages transmitted by the one or more remote units which update or provide the lead unit 14 with necessary operating information concerning the one or more remote units. These four types of messages insure a secure transmission link which has a low probability of being interferred with by communications transmitted from other units within radio transmission distance, provides complete control of the remote units 12 and provides complete information of the remote unit operation including responses to any controls originating from the lead unit 14.

All communications which originate in the lead station 30 and the one or more remote stations 32, off board repeater 26 and control tower 16 are under the control of a microprocessor controller located at each of these locations. Each individual station microprocessor is programmed to process the information required to generate communications for that station mode (lead or remote). If the stations are changeable from a lead to a remote by activation of appropriate control, the microprocessor of each station is programmed to assume either station mode. If a station is programmed to function as a lead station 30, the microprocessor is programmed to generate the link message and the commands to be transmitted to the remote units 14. If the station is programmed to operate as a remote station 32, the microprocessor is programmed to generate the link reply message and the status and alarm messages. All communications are in the form of a multibyte serial format which is transmitted on the previously described FSK modulated FM carrier. The bit positions in each byte convey information regarding different control conditions, alarms or addressing of the stations. Each of the bytes listed below, includes the usual start (0) and stop (1) bits and the odd parity check bit. These bits have been left out for purposes of simplifying the disclosure.

1. Common Format

| Byte # | Bit # | Bit Value | Functional Description of Message Format |
|---|---|---|---|
| 1 | 0 | 0 | Barker Code, byte 1 |
|   | 1 | 0 | The barker code is used to verify that a received trans- |
|   | 2 | 1 | mission is information instead of noise. The probability |
|   | 3 | 1 | of the barker code occurring randomly is small and |
|   | 4 | 1 | therefore its detection is indicative of the receipt of |
|   | 5 | 0 | information. |
|   | 6 | 1 | |
|   | 7 | 1 | |
| 2 | 0 | 0 | Barker Code, byte 2 |
|   | 1 | 0 | |
|   | 2 | 0 | |
|   | 3 | 1 | |
|   | 4 | 0 | |
|   | 5 | 1 | |
|   | 6 | 1 | |
|   | 7 | 0 | |
| 3 | 0 | $2^{**}0$ | Byte Count Byte |
|   | 1 | $2^{**}1$ | The byte count indicates the number of data bytes to |
|   | 2 | $2^{**}2$ | follow. |
|   | 3 | $2^{**}3$ | |
|   | 4 | $2^{**}4$ | |
|   | 5 | $2^{**}5$ | |
|   | 6 | not used | |
|   | 7 | not used | |
| 4 | 0 | $2^{**}0$ | Origin Code Byte |
|   | 1 | $2^{**}1$ | The origin code indicates any of eight possible |
|   | 2 | $2^{**}2$ | originating locations of a message, i.e., lead unit, remote #1, remote #2, tower control, etc. |
| 4 | 3 | $2^{**}0$ | Repeat Code |
|   | 4 | $2^{**}1$ | The repeat code indicates any of three possible repeat modes and direct transmission. The repeat modes are (1) repeated by remote #1, (2) repeated by off board repeater 26, and (3) repeated by remote #1 and off board repeater 26. |
|   | 5 | $2^{**}0$ | Message Type Code |
|   | 6 | $2^{**}1$ | The message type code indicates any of eight possible |
|   | 7 | $2^{**}2$ | message types. Only four types are described herein; link, link reply, lead command and remote status and alarm. |
| 5 | 0 | $2^{**}0$ | Source Unit Address Code, Byte 1 |
|   | 1 | $2^{**}1$ | The source unit address code is the serial number of the |
|   | 2 | $2^{**}2$ | station, i.e., lead or remote station identification |
|   | 3 | $2^{**}3$ | number. The source unit address is the second unique |
|   | 4 | $2^{**}4$ | identifier of either the lead unit or of the one or |
|   | 5 | $2^{**}5$ | more remote units. |
|   | 6 | $2^{**}6$ | |
|   | 7 | $2^{**}7$ | |
| 6 | 0 | $2^{**}8$ | Source Unit Address Code, Byte 2 |
|   | 1 | $2^{**}9$ | |
|   | 2 | $2^{**}10$ | |
|   | 3 | $2^{**}11$ | |
|   | 4 | $2^{**}12$ | |
|   | 5 | $2^{**}13$ | |
|   | 6 | $2^{**}14$ | |
|   | 7 | $2^{**}15$ | |

2. Individual Format (a) Link/Unlink Messages. The link message is used for initiating the establishment of a radio communication link between a lead unit and one or more remote units and is transmitted from the lead unit as a message addressed to a particular remote unit. The unlink message ends the previously established communication link.

| Byte # | Bit # | Bit Value | Lead Unit Identification # Bytes |
|---|---|---|---|
| 7 | 0 | $2^{**}0$ | Least Significant Digit |
|   | 1 | $2^{**}1$ | The lead unit # is preferably the four digit number |
|   | 2 | $2^{**}2$ | assigned by the railroad for identifying that unit |
|   | 3 | $2^{**}3$ | and is typically visible on the unit. The lead unit # is the first lead unique identifier. |
|   | 4 | $2^{**}0$ | 2nd Digit |
|   | 5 | $2^{**}1$ | |

-continued

| Byte # | Bit # | Bit Value | |
|---|---|---|---|
| | 6 | 2**2 | |
| | 7 | 2**3 | |
| 8 | 0 | 2**0 | 3rd Digit |
| | 1 | 2**1 | |
| | 2 | 2**2 | |
| | 3 | 2**3 | |
| | 4 | 2**0 | 4th Digit |
| | 5 | 2**1 | |
| | 6 | 2**2 | |
| | 7 | 2**3 | |
| 9 | 0 | 2**0 | Remote Unit Identification # Bytes |
| | 1 | 2**1 | Least Significant Digit |
| | 2 | 2**2 | The remote unit # is preferably the number assigned |
| | 3 | 2**3 | by the railroad for identifying that unit and is typically visible on the unit. The remote unit # is the first remote unique identifier. |
| 9 | 4 | 2**0 | 2nd Digit |
| | 5 | 2**1 | |
| | 6 | 2**2 | |
| | 7 | 2**3 | |
| 10 | 0 | 2**0 | 3rd Digit |
| | 1 | 2**1 | |
| | 2 | 2**2 | |
| | 3 | 2**3 | |
| | 4 | 2**0 | |
| | 5 | 2**1 | |
| | 6 | 2**2 | |
| | 7 | 2**3 | |
| 11 | 0 | 2**0 | System Version Code Byte |
| | 1 | 2**1 | The system version code is the third identifier used in |
| | 2 | 2**2 | the system which is common to both the remote and lead |
| | 3 | 2**3 | units, unlike the lead and remote unit identifiers. |
| | 4 | 2**4 | The version code may be thought of as another address but |
| | 5 | 2**5 | is useful for differentiating message formats associated |
| | 6 | 2**6 | with different types of equipment such as diesel or |
| | 7 | 2**7 | electric. The version code in the link and link reply messages must be in agreement with the stored version code at the receiving station for the receiving station to process the received message. |
| 12 | 0 | Link Remote #1 | Function Byte |
| | 1 | Link Remote #2 | The function byte contains a single function identification |
| | 2 | Not Used | used with the link sequence. Only one function can be |
| | 3 | Unlink Sequence (reverse of link) | transmitted with each link transmission. |
| | 4 | Not Used | |
| | 5 | Not Used | |
| | 6 | Not Used | |
| | 7 | Not Used | |
| 13 | 0 | | The vertical parity byte is used in accordance with |
| | 1 | | known techniques and an odd parity bit is generated |
| | 2 | | from the vertical parity byte. |
| | 3 | | |
| | 4 | | |
| | 5 | | |
| | 6 | | |
| | 7 | | |

(b) Link Reply Message. The link reply message is used for establishing a radio communication link between a lead unit and one or more remote units and is transmitted from the remote unit addressed by the link message in response to the link message. The first, second and third identifiers contained in the link reply message must agree with the first, second and third identifiers which are stored at the lead unit for that lead unit to complete establishment of the communication link over which all subsequent messages will be transmitted.

| Byte # | Bit # | Bit Value | Lead Unit Identification # Bytes |
|---|---|---|---|
| 7 | 0 | 2**0 | Least Significant Digit |
| | 1 | 2**1 | The lead unit # is preferably the four digit number assigned |
| | 2 | 2**2 | by the railroad for identifying that unit and is typically |
| | 3 | 2**3 | visible on the unit. The lead unit # is the first lead unique identifier. |
| | 4 | 2**0 | 2nd Digit |
| | 5 | 2**1 | |
| | 6 | 2**2 | |
| | 7 | 2**3 | |
| 8 | 0 | 2**0 | 3rd Digit |
| | 1 | 2**1 | |
| | 2 | 2**2 | |
| | 3 | 2**3 | |
| | 4 | 2**0 | 4th Digit |
| | 5 | 2**1 | |
| | 6 | 2**2 | |
| | 7 | 2**3 | |

-continued

| | | | |
|---|---|---|---|
| 9 | 0 | 2**0 | Least Significant Digit |
| | 1 | 2**1 | The remote unit # is preferably the four digit number |
| | 2 | 2**2 | assigned by the railroad for identifying that unit |
| | 3 | 2**3 | and is typically visible on the unit. |
| | 4 | 2**0 | 2nd Digit |
| | 5 | 2**1 | |
| | 6 | 2**2 | |
| 10 | 0 | 2**0 | 3rd Digit |
| | 1 | 2**1 | |
| | 2 | 2**2 | |
| | 3 | 2**3 | |
| | 4 | 2**0 | 4th Digit |
| | 5 | 2**1 | |
| | 6 | 2**2 | |
| | 7 | 2**3 | |
| 11 | 0 | 2**0 | System Version Code Byte |
| | 1 | 2**1 | The system version code is the third identifier used in the |
| | 2 | 2**2 | system which is common to both the remote and lead units |
| | 3 | 2**3 | unlike the lead and remote unit identifiers which are uniquely |
| | 4 | 2**4 | assigned to each unit. The version code may be thought |
| | 5 | 2**5 | of as another address but is useful for differentiating |
| | 6 | 2**6 | message formats associated with different types of equipment |
| | 7 | 2**7 | such as diesel or electric. The version code in the link and link reply messages must be in agreement with the stored version code at the receiving station for the receiving station to process the received message. |
| 12 | 0 | Link Remote #1 | Function Byte |
| | 1 | Link Remote #2 | The function byte contains a single function identification |
| | 2 | Not Used | used with the link sequence. Only one function can be |
| | 3 | Unlink Sequence (reverse of link) | transmitted with each link transmission. |
| 12 | 4 | Not Used | |
| | 5 | Not Used | |
| | 6 | Not Used | |
| | 7 | Not Used | |
| 13 | 0 | | Vertical Parity Byte |
| | 1 | | The vertical parity byte is used in acordance with known |
| | 2 | | techniques and an odd parity bit is generated from the |
| | 3 | | vertical parity byte. |
| | 4 | | |
| | 5 | | |
| | 6 | | |
| | 7 | | |

(c) Command Messages. The command messages are the control functions that a lead unit can specify a remote unit to perform and include the whole range of operations which could be performed by an engineer in a remote unit. In a command, a particular bit is used if the control function is "yes" or "no" or a combination of bits are used if different degrees of control are possible, e.g., unit traction mode where eight throttle settings are used. Each command contains all of the current functions to be performed at the instant of transmission.

| Byte # | Bit # | Bit Value | Lead Function Control Bytes |
|---|---|---|---|
| 7 | 0 | 2**0 | Analog multiplexer bits |
| | 1 | 2**1 | These four bits are used to command the display of analog |
| | 2 | 2**2 | quantities of the operation of a remote unit on the console |
| | 3 | 2**3 | and are used preferably for the display of (1) flow rate |
| | 4 | Not Used | data of air flow into the brake pipe of a remote locomotive 12 |
| | 5 | Not Used | (FIGS. 6 and 14), (2) equalizing reservoir pressure (FIGS. 5 |
| | 6 | Not Used | and (6), (3) brake pipe pressure (FIG. 5) and (4) brake cylinder pressure. |
| | 7 | | Change radio select bit This bit commands that radio transmitter be changed to the remaining backup transmitter. |
| 8 | 0 | ER | Engine run enabling function |
| | 1 | GF | Generator field for traction mode |
| | 2 | B | Brake (electric) |
| | 3 | BG | Brake Set-up |
| | 4 | FO | Forward direction |
| | 5 | RE | Reverse direction |
| | 6 | MS | Ground Relay Reset. This bit resets the electrical |
| | 7 | GRR | ground detector in the remote unit. |
| 9 | 0 | 2**0 | Traction/brake bits |
| | 1 | 2**1 | These are the eight possible throttle settings |
| | 2 | 2**2 | |
| | 3 | DV | Engine shut-down |
| | 4 | FV | Feed value in This enables remote brake pipe charging. |
| | 5 | ISO | Isolate command bit This bit disables the remote unit from responding to engine and airbrake commands. Alarm functions are transmitted. |
| | 6 | Not Used | |

-continued

| Byte # | Bit # | Bit Value | |
|---|---|---|---|
| | 7 | Not Used | |
| 10 | 0 | 2**0 | These bits control independent application of unit brakes. |
| | 1 | 2**1 | The unit brakes are energizable in sixteen 800 m. sec. |
| | 2 | 2**2 | intervals up to 12.5 seconds duration. |
| | 3 | 2**3 | |
| | 4 | IBR | Independent brake release. This bit releases the independent brakes. |
| | 5 | Not Used | |
| | 6 | Not Used | |
| | 7 | EBA | Emergency application of air brakes. Full braking applied to air brakes and the unit to be placed in the idle state. |
| 11 | 0 | 2**0 | Automatic application of air brakes. A specified pressure |
| | 1 | 2**1 | in the equalizing reservoir is established with each |
| | 2 | 2**2 | automatic brake application (FIG. 9) from a first 7 psi |
| | 3 | 2**3 | reduction to successive one-half pound intervals. |
| | 4 | 2**4 | |
| | 5 | 2**5 | |
| | 6 | 2**6 | |
| | 7 | ABR | Automatic release/emergency reset commands full release of train brakes. |
| 12 | | | Vertical Parity |
| | | | The vertical parity byte is used in accordance with known techniques and an odd parity bit is generated from the vertical byte parity. |

(d) Status/Alarm Messages. The status/alarm messages are the response to lead unit commands and alarm conditions that a remote unit transmits to the leads unit for conveying information of remote unit performance which requires prompt atention by the engineer in the lead unit.

| Byte # | Bit # | Bit Value | Remote Unit Operations |
|---|---|---|---|
| 7 | 0 | 2**0 | Analog multiplexer bits |
| | 1 | 2**1 | These bits are used to display analog quantities of the |
| | 2 | 2**2 | operation of a remote locomotive as specified in a command |
| | 3 | 2**3 | message from the lead unit message. |
| | 4 | WARN | Remote System Warning. This bit signals non-fatal system failures, such as power supply performance drop. |
| | 5 | FAIL | Remote System Fail. This bit signals total system failure, such as failure of the air brakes or DIA converter. |
| | 6 | | Communication Check Request. This bit requests a communication check of the radio channel from the lead unit. |
| 7 | 7 | SRB | Alternative Radio Selected. This bit signals activation of the backup radio. |
| 8 | 0 | ER | Engine Run |
| | 1 | GF | Generator Field |
| | 2 | B | Brake |
| | 3 | BG | Brake Set-up |
| | 4 | FO | Forward direction |
| | 5 | RE | Reverse direction |
| | 6 | MS | Sand applied |
| | 7 | GRR | Ground Relay Reset |
| | | | These bits signal various remote unit engine conditions. |
| 9 | 0 | 2**0 | Traction/brake |
| | 1 | 2**1 | These bits signal which of the eight possible traction/ |
| | 2 | 2**2 | brake conditions have been selected. |
| | 3 | DV | Engine Shut-down. This bit signals remote engine shut-down. |
| | 4 | FV | Feed value in. This bit signals charging of the brake pipe by a remote unit. |
| | 5 | ISO | Isolate. This bit signals placing of a remote unit in isolate |
| | 6 | Not Used | |
| | 7 | | Invalid Traction Step. This bit signals an invalid throttle setting. |
| 10 | | | Function Acknowledge Bits |
| | 0 | | Traction/Dynamic Brake Change |
| | 1 | | Operating Step Change |
| | 2 | | Feed valve |
| | 3 | | Independent Brake Application |
| | 4 | | Independent Brake Release |
| | 5 | | Automatic Application |
| | 6 | | Automatic Release/Emergency |
| | 7 | | Emergency Application of Brakes |
| | | | These bits acknowledge remote performance. |
| 11 | 0 | 2**0 | Remote Unit Operations |
| | 1 | 2**1 | These bits control the digital read-out in the lead unit |
| | 2 | 2**2 | console. |
| | 3 | 2**3 | |
| | 4 | 2**4 | |
| | 5 | 2**5 | |
| | 6 | 2**6 | |
| | 7 | 2**7 | |
| 12 | | | Alarms |
| | 0 | BW | Brake Warning |

| | | | |
|---|---|---|---|
| | 1 | SG | General |
| | 2 | GR | Ground Relay |
| | 3 | PC | PC Trip |
| | 4 | Not Used | |
| | 5 | Not Used | |
| | 6 | Not Used | |
| | 7 | WS | Wheel Slip |
| | | | These bits indicate specified alarm conditions in a remote unit. |
| 13 | 0 | Not Used | |
| | 1 | | Engine Brakes Applied |
| | 2 | | Uncommanded Brake Release which occurs when brake pipe pressure rises at least 2 psi. |
| | 3 | Not Used | |
| | 4 | | Significant Unexpected flow into brake pipe at remote unit. |
| | 5 | Not Used | |
| | 6 | Not Used | |
| | 7 | Not Used | |
| 14 | | | Vertical Parity Byte |
| | | | The vertical parity byte is used in accordance with known techniques and an odd parity bit is generated from the vertical byte. |

VI. Microprocessor Programs

FIG. 7 illustrates the sequence of programs which are individually processed asynchronously with respect to each other by each of the microprocessors 54 located respectively at the lead unit 14 and the one or more remote units 12. It should be understood that FIG. 7 is a composite of the programs which are executed by both the lead and the remote station microprocessors. The section of programs to the left in FIG. 7, which is identified by the legend "lead" are the programs executed by the lead station 30 and the section of programs to the right in FIG. 7, which is identified by the legend "remote" are the programs executed by the one or more remote stations 32. Referring to FIG. 7, each control program 200 starts at starting point 202 and proceeds to point 204 where all hardware in the associated station is initialized. A system power on test is provided at point 205, between points 204 and 206, to check the operational status of the microprocessor system of FIG. 4. The program proceeds from point 204 to point 206 where a determination is made if the station has been designated as a lead station or a remote station. One way for the designation to be made is by the activation of an appropriate control on the station console 34 (FIG. 3). The program proceeds to point 208 where the actual determination is made of whether the particular station was designated as lead or remote.

A. Lead Station Programs

If the station has been designated as a lead station, the program proceeds to point 210 where the subroutine for lead system mode function is executed. The lead system mode function is described in detail infra with reference to FIG. 8. The program proceeds from point 210 to point 212 where the lead automatic brake function subroutine is processed. The lead automatic brake function subroutine is described in detail infra with regard to FIG. 9. The program proceeds from point 212 to point 214 where the lead independent brake subroutine is processed. This subroutine controls engine brakes in the lead end remote units and is activated by the push button input described supra from the console 44 of the lead unit. The details of the lead independent brake function subroutine are not described herein for the reason that they are not necessary for understanding the present invention. The program proceeds from point 214 to point 216 where the lead feed valve function subroutine is processed. The lead feed valve function subroutine point 216 controls remote feed valve sequencing and the brake pipe continuity test which is a necessary condition for starting the operation of the train after the linking sequence has been completed by the transmission of the link and link reply messages. In the lead feed valve function subroutine 216, after the application of an automatic brake application by the train engineer to the lead unit 14, the program searches for a radio communication message from each of the one or more remote units 12 which signals that a significant flow rate has been sensed by the flow sensor of FIG. 5 located at each remote unit. If no radio communication is received from any of the one or more remote units 12, the lead station interprets the absence of the radio communication as a brake pipe discontinuity which is a serious condition under which the train should not be operated. The program proceeds from point 216 to point 218 where the lead status function subroutine is executed. The lead status function subroutine point 218 reads inputs from the various sensors in the lead unit, stores those inputs and processes the inputs as necessary for system operation. The details of the lead independent brake function subroutine 218 are not described herein for the reason that they are not necessary for understanding the present invention. The program proceeds from point 218 to point 220 where the console communication function subroutine is executed. The function of the console communications function subroutine is to perform input-output functions for the console 34 in the lead station. The details of the console communication function subroutine 220 are not described herein for the reason that they are not necessary for understanding the invention. The program proceeds from point 220 to point 222 where the lead events recording function subroutine is executed. The lead events recording function subroutine 222 is an optional digital recording function of system operation which stores various parameters of system operation in the random access memory which may be contained within the processing board 54 of FIG. 4 and provides a printed output for later analysis. The program proceeds from point 222 to point 224 where the system diagnostics subroutine is executed for determining the operability of various parts of the system. The details of the system diagnostics subroutine 224 are not described herein for the reason that they are not necessary for understanding the invention.

B. Remote Stations

If the station is a remote station, the program proceeds from point 208 to point 226 where the remote system mode function subroutine is executed. The details of the remote system function subroutine 226 are described infra with regard to FIG. 10. The program proceeds from point 226 to point 228 where the remote automatic brake function subroutine is executed. The details of the remote automatic brake function subroutine 228 are described infra in conjunction with FIG. 11. The program proceeds from point 228 to point 230 where the remote independent brake function subroutine is executed. The function of the remote independent brake function subroutine point 230 is to execute the control functions dictated by the lead independent brake function subroutine (point 214) after appropriate commands have been received via the communication channel between the lead unit 14 and the remote unit 12. The details of the remote independent brake function subroutine 230 are not described herein for the reason that they are not necessary for understanding the invention. The program proceeds from point 230 to point 232 where the remote feed valve function subroutine is executed. The remote feed valve function subroutine 232 executes the control functions dictated by the lead feed valve function subroutine (point 216) after the commands have been received over the radio communication channel between the lead unit 14 and the remote unit 12. The details of the remote feed valve function subroutine 232 are not described herein for the reason that they are not necessary for understanding the invention. The program proceeds from point 232 to point 234 where the remote status function subroutine is executed. The remote status function subroutine 234, processes messages from the lead locomototive 14 requesting data, reads the data, and transmits the data to the lead unit. The remote status function subroutine 234 also executes engine commands. The details of the remote status function subroutine 234 are not described herein for the reason that they are not necessary for understanding the invention. The program proceeds from point 234 to the remote events recording function subroutine 236 which is an optional digital recording function of system operation analogous to that described with reference to the lead events recording function subroutine (point 222). The program proceeds from point 236 to point 238 where the system diagnostics subroutine is executed for checking the operability of the various parts of the system. The details of the system diagnostics subroutine 238 are not described herein for the reason that they are not necessary for understanding the invention.

It should be understood that the microprocessor cycles through the foregoing subroutines repeatedly and executes various parts of the subroutines on a real time basis as the necessary conditions permitting their execution occur.

C. Lead Station Mode Function Program

Figure 8:
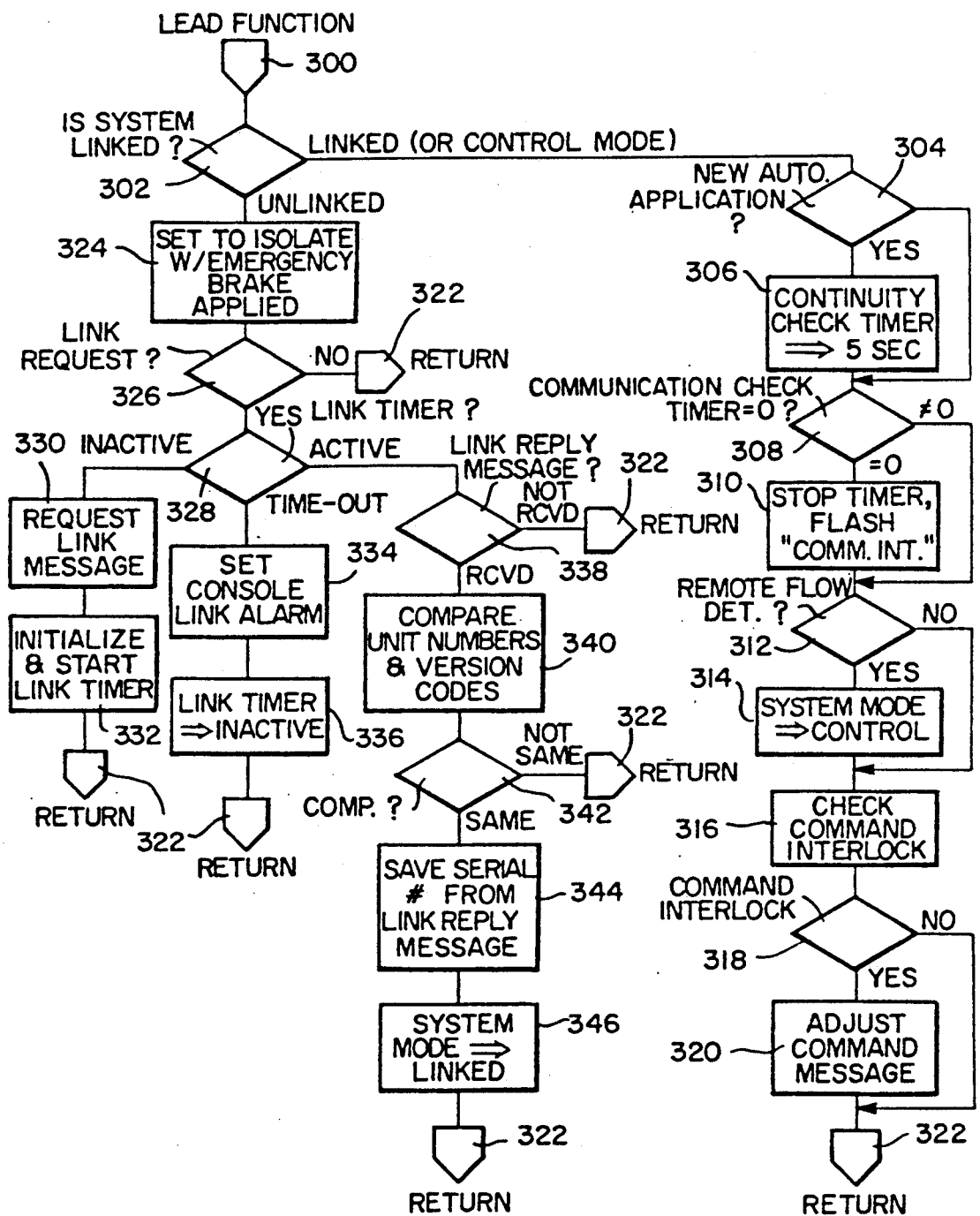
FIG. 8 is a flow chart of the lead unit function control program.

FIG. 8 illustrates the microprocessor control flow chart for the execution of the linking function by the lead station 30. The entire linking function by the lead station 30 includes the generation of the link message and the processing of the link reply messages generated by the one or more remote units 12 and the subsequent generation of a command which establishes the communication link between the lead unit 14 and one of the remote units. The program starts at point 300 and proceeds to decision point 302 where a determination is made if the lead unit 14 is linked. If the answer is "yes", the program proceeds to decision point 304 where a determination is made if a new automatic brake application has been made. A new automatic brake application is the execution of the engineers' brake command by the activation of the automatic brake pushbutton on the brake console 44 in FIG. 3. If the answer is "yes", the program proceeds to point 306 where a communication check software timer is set for five seconds. The communication check timer is used to check the system communications during an automatic brake application. If the remote(s) do not reply (with an automatic brake application acknowledge bit set) within 5 seconds, a communication interruption alarm is displayed on the console. The program proceeds from point 306 to point 308 where a determination is made if the communication check timer started at point 306 is zero. If the timer has reached zero, the program proceeds to point 310 where a communication interruption message is flashed on a control console 34 of the lead unit 14. If the communication check timer is not equal to zero, the program branches from point 308 bypassing point 310 to point 312 where the latest remote status message is checked for the unexpected significant air flow bit. If the answer is "yes", the program proceeds to point 314 where the system enters the control mode which permits the remote unit 12 to cooperate with the lead unit 14 to move the train. If a remote flow was not detected at decision point 312, the program bypasses the system mode control point 314 to point 316 where the unit controls are read to determine if they are set in an improper operational mode, e.g., dynamic brakes and throttle applied at the same time or the lead unit set in forward and reverse, etc. The program proceeds from point 316 to point 318 where a determination is made if any command interlocks in fact do exist. If the answer is "yes", the program proceeds to point 320 where the next command message to be transmitted is adjusted to eliminate the improper conditions. If the answer is "no", at decision point 318, the program proceeds to return point 322 while bypassing the command message adjustment point 320 previously described. The return point 322 herein and in the ensuring description of the remaining subroutines is to the main program where the next subroutine is entered. The previously described sequence of program steps resulting from a "yes" determination at point 302 is for the purpose of detecting if the train 18 is in the linked or control state. If the determination at point 302 was "no", the program proceeds to the section where the beginning of linking is initiated at point 324. At point 324 the train is set in the isolate condition with the emergency brakes applied which prevents movement of the train until the linking sequence is completed. The program proceeds from point 324 to point 326 where a determination is made if the appropriate control on the control console 34 of the lead unit 14 has been activated to request linking with a particular remote unit 12. It should be understood at this juncture that the address select switches of box 56 located on the lead console 34 have been activated to store the remote unit numbers (first unique remote identifiers) to which the lead unit 14 is to be linked and that the remote units have their link unit number switches of box 56 set to store the first identifier of the lead unit. If the answer is "no" at decision point 326, the program returns to the next subroutine via the return point 322. If the answer is "yes" at decision point 326, the program proceeds to decision point 328 where the program has three different branch options based on the state of the software link timer. The first branch option is when the link timer is inactive which occurs only when the link command has been initially given from the console 34 in the lead station 30. The program proceeds from decision point 328 in the inactive state to point 330 where the link message request is given. The link message request point activates the transceiver 28 of the lead unit 14 to produce a link message with the format described above under the communications section. The program proceeds from point 330 to point 332 where the link timer is initialized and started. The program proceeds from block 332 to the return point 322. The timing out interval for the link timer is five seconds. If five seconds have elapsed, the program proceeds from point 328 to point 334 where the appropriate indicator on the console is lited to signal a link alarm. The program proceeds from point 334 to point 336 where the link timer is placed in the inactive state as described above. The program proceeds from point 336 to the return 322 as described above. If the link timer is active at decision point 328, the program proceeds to decision point 338 where a determination is made if a link reply message has been received by the lead unit station 30. If a link reply message has not been received, the program branches to return point 322. If a link reply message has been received, the program branches to point 340 where a comparison is made of the stored first unique identifiers of the lead and remote units and the version code (third identifier) with the first lead and remote identifiers and version code contained in the received link reply message. The program proceeds to decision point 342 where the results of the comparison are checked. If the comparison at point 342 is not identical, the program proceeds to the return point 322. If the comparison at point 342 of the first identifiers and the version code is identical, the program proceeds to point 344 where the second unique identifier contained in the link reply message is stored in memory of the lead station 30 for use in addressing the remote unit 12 for all future commands to be transmitted by the lead unit 14 after the linking sequence is completed. The program proceeds from point 344 to point 346 where the system enters the linked mode. The receipt of the first regular command after the saving of the second unique identifier at point 344 confirms the establishment of the communication link between the lead unit 14 and that remote unit 12. The program proceeds from point 346 to return point 322.

D. Lead Station Automatic Brake Function

Figure 9:
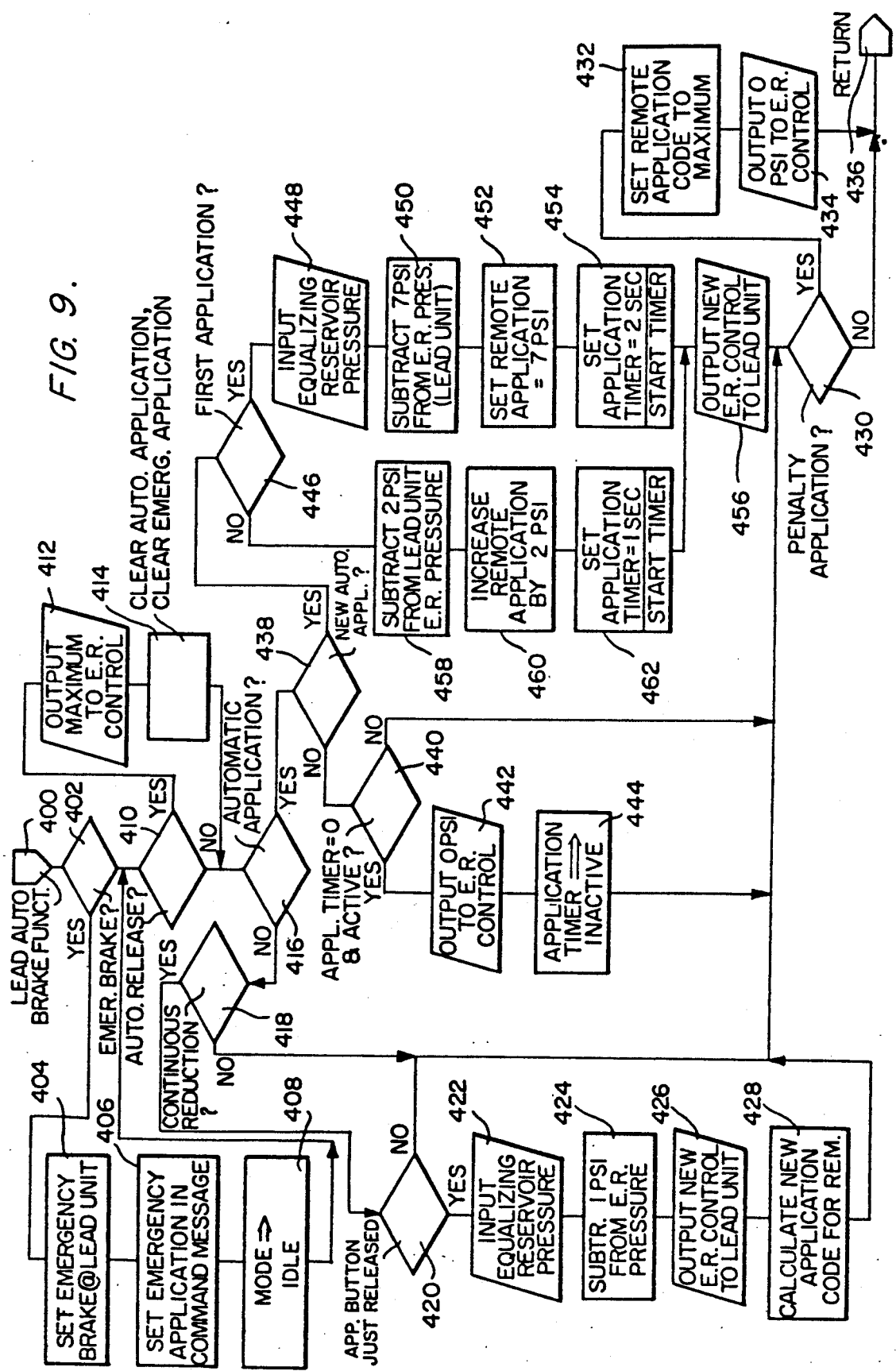
FIG. 9 is a flow chart of the lead unit automatic brake function control program.

FIG. 9 illustrates a flow chart of the microprocessor control program for the lead unit automatic brake function. The program proceeds from starting point 400 to decision point 402 where a determination is made if the emergency brakes for the train are to be set. If the answer is "yes", the program proceeds to point 404 where the emergency brakes at the lead unit 12 are set by deactivating the emergency solenoid valve in the lead unit. The program proceeds from point 404 to point 406 where a command message is transmitted from the lead unit 14 to the remote units 12 requesting the setting of the emergency brakes in the remote units. The format of the command message is that specified supra with regard to command messages in the communication section. The program proceeds from point 406 to point 408 where the system operation is changed to the idle mode which disables the lead unit 14 from transmitting any control functions. The program proceeds from point 408 to decision point 410 where a determination is made if a release of the automatic brakes has been requested. If the answer is "yes", the program proceeds to point 412 where the air pressure regulation system of FIGS. 5 and 6 outputs maximum air pressure to the equalizing reservoir 82 causing the air brakes to be fully released. The program then proceeds from point 412 to point 414 where the pneumatics are cleared and reset for both the automatic brake function and the emergency brake function. The program proceeds from point 414 to point 416 where a determination is made if there is an automatic brake application present. If the answer is "no", the program proceeds to point 418 where a determination is made if a continuous reduction is being made. If the answer is "yes", the program proceeds to decision point 420 where a determination is made if the button for requesting automatic brake application on the automatic brake console 44 has just been released. If the answer is "yes" at decision point 420,, the program proceeds to point 422 where the pressure reading by the pressure transducer 106 of FIG. 6 is inputted. The program proceeds from point 422 to point 424 where one p.s.i. is substracted from the specified equalizing reservoir pressure. The program proceeds from point 424 to point 426 where the new equalizing reservoir control pressure is outputted to the lead station 30 for the maintenance of the equalizing reservoir 82 at a new pressure. The program proceeds from point 426 to point 428 where the calculation is made of the new equalizing reservoir pressure for the remote units 12. The remote equalizing reservoir pressure reduction at point 428 is equal to the difference between the maximum lead equalizing reservoir pressure and the current lead equalizing reservoir pressure. If the answer was "no" at decision point 418, the program proceeds to decision point 430 where a determination is made if a penalty brake application is required. Typical penalty conditions include an overspeed condition of the unit, a dead man control in the unit is not activated or the lead brake valve control has been moved out of the release position. If the answer is "yes", the program proceeds to point 432 where the equalizing reservoir pressure to be applied by the remote unit is set to cause maximum braking upon the transmission of the next command. The program proceeds from point 432 to point 434 where an output of 0 p.s.i. is transmitted to the equalizing reservoir control which allows the equalizing reservoir to fall at its maximum programmed rate. The program proceeds from point 434 to return point 436 which returns the program to the execution of the next subroutine in the master flow chart of FIG. 7. If the answer at decision point 430 was "no", the program proceeds directly to the return point 436. If the determination at decision point 416 was "yes" that there was an automatic brake application request, the program proceeds to decision point 438. The determination at decision point 438 is "yes" each time the automatic brake button in the lead unit is pushed. If the decision at point 438 is "no", the program proceeds to decision point 440 where a determination is made if the timer for the automatic brake application is equal to zero and active. If the answer is "yes" at decision point 440 which indicates that the automatic brake application timer has timed out, the program proceeds to point 442 where 0 psi is outputted to the equalizing reservoir pressure regulation control which allows the equalizing reservoir to fall at its maximum programmed rate. The program proceeds from point 442 to point 444 where the automatic brake application timer is inactivated. The program proceeds from point 444 to decision point 430 as previously described. If the answer was "no" at decision point 440, the program proceeds directly to decision point 430 as described. If the answer was "yes" at decision point 438 that there was a new automatic application of the air brakes, the program proceeds to decision point 446 where a determination is made if the application was the first application. If the application was determined to be the first application (from a release condition) at decision point 446, the program proceeds to point 448 where the pressure in the equalizing reservoir 82 is read from the pressure transducer 106 of FIG. 6. This is saved as the maximum equalizing reservoir pressure. The program proceeds from point 448 to point 450 where 7 psi is substracted from the maximum equalizing reservoir pressure. The program proceeds from point 450 to point 452 where the 7 psi drop specified for the lead unit at point 450 is set for application at the remote unit 12. The 7 psi drop for the remote unit 12 is transmitted to the remote unit during the next command message. The program proceeds from point 452 to point 454 where the automatic brake application timer is set for 2 seconds and the timer is started to run. The program then proceeds to point 456 where the new pressure dictated by the setting of the automatic brake valve 78 is outputted to lower the pressure in the equalizing reservoir 82 to the desired pressure by the appropriate application of control signals to the valves of the pressure regulation apparatus of FIG. 6. The program proceeds from point 456 to the previously described decision point 430. If the answer was "no" at decision point 446 that the application of the automatic brakes was not the first application, the program proceeds to point 458 where 2 psi is subtracted from the pressure of the equalizing reservoir of the lead unit 14 which is currently being maintained. This drop in pressure will apply the brakes harder. The program proceeds to point 460 where the specified 2 psi pressure drop in the lead unit 14 is translated to the requested pressure of the equalizing reservoir of the remote unit 12. The two pound pressure drop specified at point 460 is transmitted to the remote units at the next command message. The program proceeds from point 460 to point 462 where the automatic brake application timer is set equal to one second and the timer is started. The timer enables a continuous reduction in equalizing reservoir pressure only after the button has been pressed for 1 second. The one second interval is sufficient to drop the equalizing reservoir approximately 2 psi. Thereafter the program proceeds to point 456 as previously described.

E. Remote Station Mode Program

Figure 10:
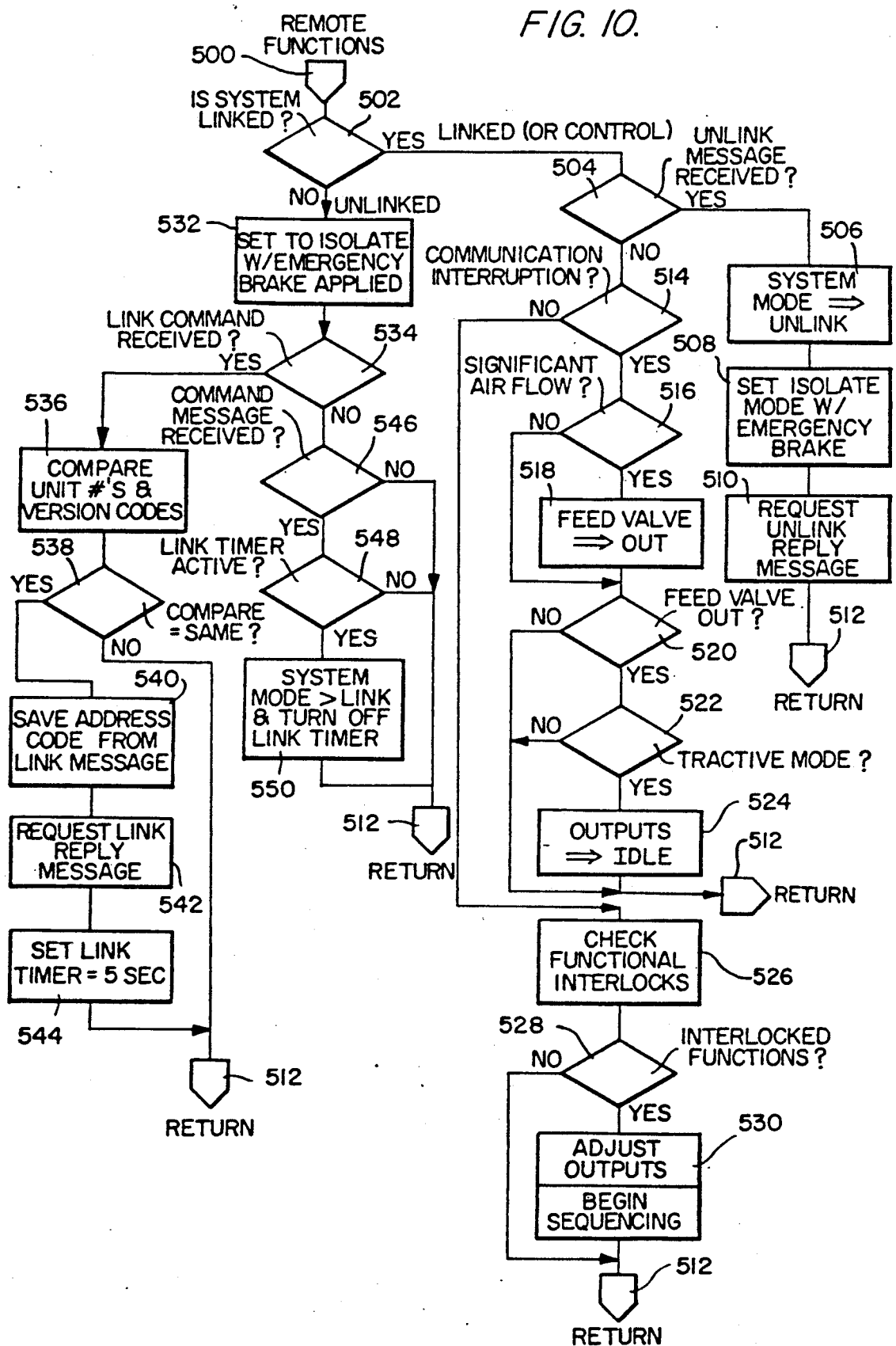
FIG. 10 is a flow chart of the remote unit function control program of the present invention.

FIG. 10 illustrates a flow chart of the microprocessor program of the remote stations 32 for processing communications and remote functions. The program starts at starting point 500 and preceeds to decision point 502 where a determination is made if the system is linked. If the system is linked (or in control mode), the program proceeds to decision point 504 where a determination is made if an unlink message, described above in section V with reference to the link message (byte 12, bit 3) has been received. If the answer is "yes" at decision point 504, the program proceeds to point 506 where the system is unlinked. At point 506 the electronic controls of the remote station 32 are reset to prepare the system for another linking sequence. The program proceeds from point 506 to point 508 where the remote units 12 are set in the isolate mode with the emergency brakes applied. In the isolate mode, the remote unit 12 may not execute any commands from a lead unit 14. The program proceeds from point 508 to point 510 where the remote unit 12 requests the transmission of a reply message to the lead unit 14 acknowledging the receipt of the unlink request. The program proceeds to return point 512 where it returns to the main program to execute the next subroutine. If the answer was "no" at decision point 504, the program proceeds to decision point 514 where a determination is made if there is a communication interruption. A communication interruption is defined as a forty five second gap since the receipt of the last message from the lead unit 14. Normally, the lead unit 14 transmits at least every twenty seconds which prevents the timing out of the forty five second timer. If there has been a communications interruption detected at decision point 514, the program proceeds to decision point 516 where a determination is made if a sufficient air flow has been detected at the remote station 32 by the flow rate analyzier of FIG. 5 as discussed supra. When the communications channel is out between the lead unit 14 and the remote unit 12, a significant air flow is interpreted as a lead unit brake application which requires a remote idle-down and cut-out of the freed valve thereby allowing the brakes to be fully applied. The program proceeds from decision point 516 is a significant air flow has been detected to point 518 where the feed valve is moved to the out position. The program proceeds to decision point 520 where the determination is made if the feed valve is out. If the feed valve is out, a program proceeds to decision point 522 where a determination is made if the remote unit 14 is in the traction mode. If the answer is "yes" at decision point 522, the program proceeds to point 524 where the remote unit is placed in the die condition. The program proceeds from point 524 to point 512 which is a return to the main program. If the answer was "no" at decision point 514, the program bypasses the previously described sections of the program and proceeds directly to point 526, where a determination is made if any functional interlocks exists by the activation of inconsistent control functions such as the application of high throttle settings and high dynamic braking or the lead unit 14 being in forward and the remote units 12 being in reverse, etc. If the answer was "no" at decision point 520, the program proceeds directly to point 512. If the answer was "no" at decision point 522, the program proceeds directly to point 512. The program proceeds from point 526 to decision point 528 where the actual determination is made if any functional interlocks exist. If the answer is "yes" at decision point 528, the program proceeds to point 530 where the various control functions are adjusted to remove the interlock condition and the operation of the remote unit is sequenced into the requested condition. If the answer was "no" at decision point 528, the program proceeds directly to return point 512. The program also proceeds to return point 512 from point 530. If the answer was "no" at decision point 502, the program proceeds to point 532 where the remote unit is placed in the isolate condition with the emergency brakes applied. The isolate condition disables all unit control functions with the emergency brakes applied. The program proceeds from point 532 to decision point 534 where a determination is made if a link command has been received. If the answer is "yes", the program proceeds to point 536 where a comparison is made of the stored first identifiers of the lead and remote unit and version code with the first lead and remote identifiers and the version code contained in the link message. The program proceeds from point 536 to point 538 where a determination is made if the first identifiers and the third identifier (version code) are identical. If the answer is "yes" at point 538, the program proceeds to point 540 where the second unique identifier (serial number of lead station 30) is stored in the RAM memory of the remote station 32. The program proceeds to point 542 where a request is made for the remote station to transmit a link reply message. The program proceeds from point 542 to point 544 where the link timer is set equal to five seconds. The function of the link timer is to detect if a command message is received by the remote station within five seconds which is required to complete the linking sequence. If the timer times out in five seconds, the linking sequence is aborted. If the answer at decision point 534 was "no", the program proceeds to decision point 546 where a determination is made if a command message from a lead unit 14 was received. If the answer is "yes", the program proceeds to decision point 548 where a determination is made if the link timer is active. The link timer is active only one time between the receipt of a link message and the receipt of a command from the lead unit 14 after transmission of the link reply message which completes the link sequence. If the answer is "yes" at decision point 548, the program proceeds to decision point 550 where the system is changed from the system mode and the link timer is turned off. The program proceeds from point 550 to return point 512. If the answer was "no" at decision point 546 or decision point 548, the program proceeds directly to return point 512.

F. Remote Station Automatic Brake Function

Figure 11:
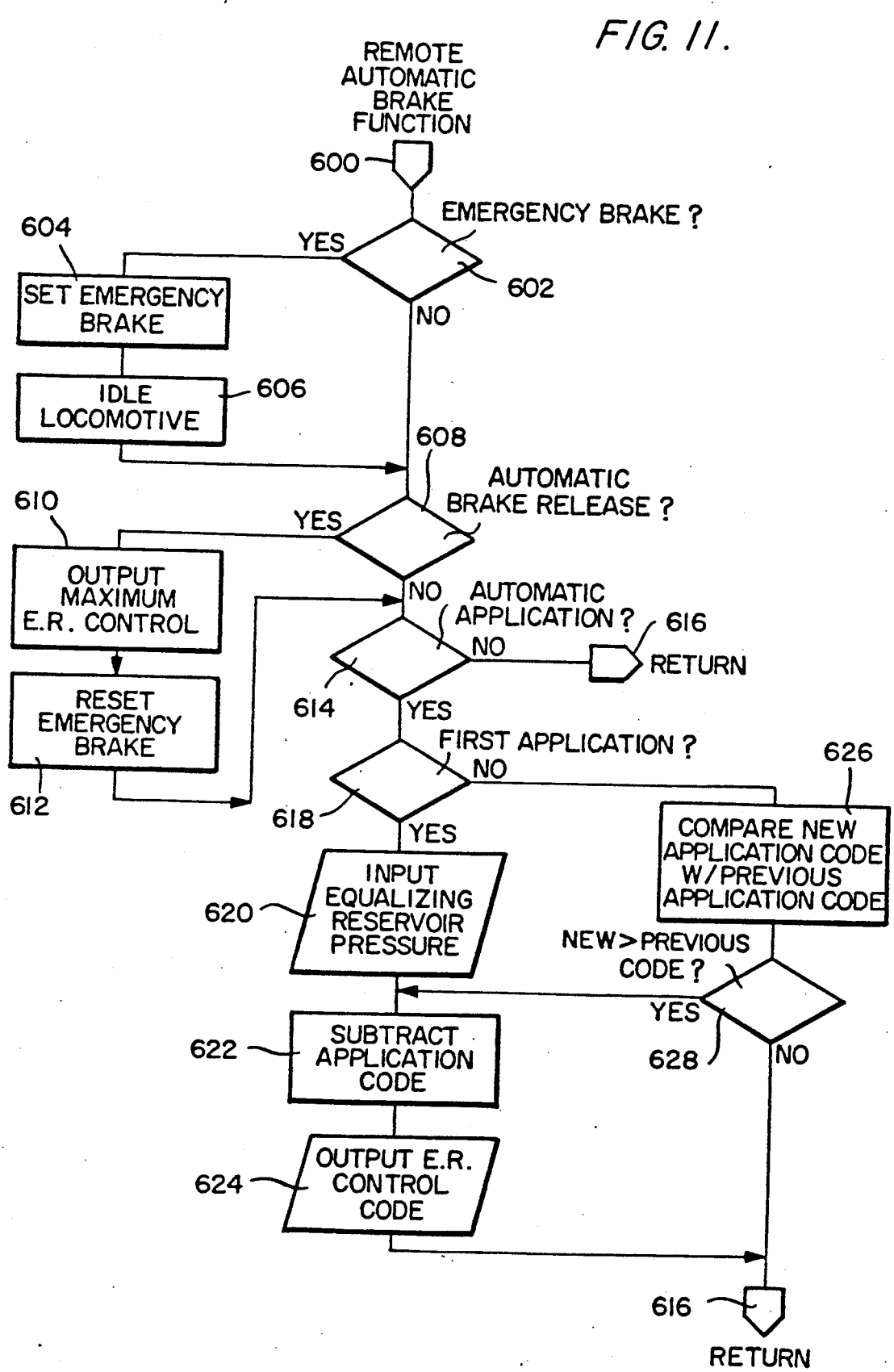
FIG. 11 is a flow chart of the remote unit automatic brake function control program.

FIG. 11 illustrates the flow chart of the microprocessor remote station automatic brake function program. The program proceeds from starting point 600 to decision point 602 where a determination is made if a command has been made to activate the emergency brakes in the remote unit 12. If the answer is "yes", the program proceeds to point 604 where the appropriate controls are set for activating the emergency brakes at the remote unit. The program proceeds to point 606 where the various unit controls are placed in the idle mode. If the answer is "no" at decision point 602, the program proceeds to decision point 608 where a determination is made if there has been an automatic brake release. If the answer is "yes" at point 608, the program proceeds to point 610 where the maximum air pressure commanded in the equalizing reservoir 82 is set in the memory for maintaining a specified equalizing reservoir pressure. The microprocessor control acts on the specification of a maximum equalizing reservoir pressure to cause the release of the automatic brakes. The program proceeds from point 610 to point 612 where the emergency brakes are reset. If the answer was "no" at decision point 608 that there had not been an automatic brake release, the program proceeds to decision point 614 where a determination is made if there has been an automatic application of the air brakes at the remote unit. The program proceeds from point 612 to decision point 614. If the answer is "no" at decision point 614, the program proceeds to return point 616 where the program returns to the main program to process another subroutine. The program proceeds from decision point 614 to decision point 618 where determination is made if the automatic application of the air brakes detected above at decision point 614 was the first automatic application of the air brakes. If the answer is "yes" at point 618, the program proceeds to decision point 620 where the equalizing reservoir pressure read by the pressure transducer 106 of FIG. 6 is inputted. The program proceeds from point 620 to point 622 where the specified air pressure reduction contained in the automatic brake application is subtracted from the stored value of the pressure which was being maintained in the equalizing reservoir by the pressure regulator. The program proceeds from point 622 to point 624 where the specified pressure is outputted to cause the equalizing reservoir to assume the new lower pressure contained in the stored value of the desired equalizing pressure. The program proceeds from point 624 to return point 616. If the answer was "no" at decision point 618, the program proceeds to point 626 where a comparison is made of the newly specified equalizing reservoir pressure reduction (application code) with the previously specified equalizing reservoir pressure reduction. If the newly specified pressure reduction results in an actual rise in equalizing pressure, it is not allowed. A graduated release of air brakes caused by an increase in air pressure is not allowed because different cars release their air brakes at different pressures and rates. Thus all air brake releases must be by the application of maximum brake pipe pressure. The program proceeds from point 626 to decision point 628 where the actual determination is made if the newly specified equalizing reservoir pressure reduction is greater than the previously specified equalizing pressure reduction. If the newly specified equalizing reservoir pressure reduction is greater than the previous pressure reduction, the program proceeds to the previously described point 622 where the new pressure reduction is subtracted rom the maximum pressure. If the answer is "no" at decision point 628, the program proceeds to return point 616.

G. Linking Sequence

Figure 12:
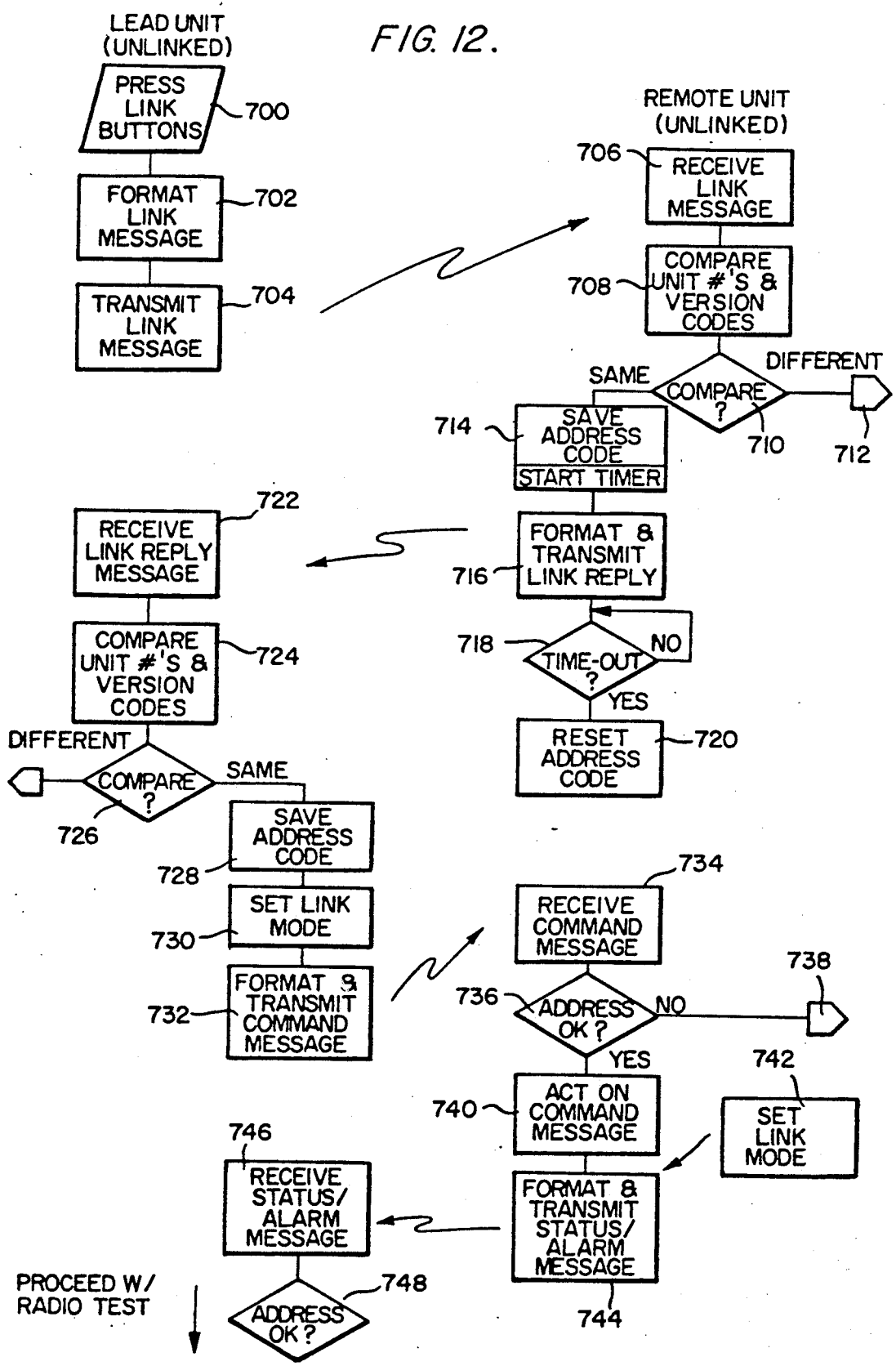
FIG. 12 is a program illustrating the sequence of communications which occur during the establishing of a communications channel between a lead unit and a remote unit.

FIG. 12 temporally illustrates the sequence of communications which occurred during the linking sequence. The linking sequence is started in an unlinked condition by the pressing of the link buttons on the control console 34 of the lead unit 14 as indicated at point 700. The program proceeds from point 700 to point 702 where the formatting of the link message in accordance with the format discussed supra in the section V is accomplished. The program proceeds from point 702 to point 704 where the previously formatted link message is transmitted from the lead unit 14. Each of the one or more remote units 12 receives the transmitted link message at point 706. Thereafter at point 708, the stored first unique identifiers of the lead and remote unit and the third identifier are compared with the received first unique identifiers and the third identifier. At point 710 a determination is made if the various identifiers are in agreement. If the answer is "no", the remote unit remains in the unlinked condition as indicated by point 712. If the comparison does agree, the remote unit 12 saves the second unique identifier contained in the link message and starts the link timer as indicated at point 714. The remote unit next formats and transmits a link reply message of a format as discussed supra in the section V at point 716. After the transmission of the link reply message by the remote unit 12, the lead unit 14 receives the link reply message at point 722. The lead unit 14 at point 724 compares the stored first lead and remote unique identifiers and the third identifier with the received first unique lead and remote identifiers and the third identifier. If the determination at point 726 is different, the lead station 30 ignores the communication. If the comparison at point 726 of the identifiers agrees, the lead station 30 proceeds to point 728 where the second unique identifier contained in the link reply message is saved for the purpose of checking the addressing in the later status/alarm generated by the remote station. The lead station 30 is set in the linked mode at point 730. Thereafter at point 732, the lead unit 734 transmits a command message to the remote unit 14 which sent the link reply message. The function of this command message is twofold in that one it transmits a command which should be processed by the remote unit 12 and is also interpreted by the remote unit as completing the link sequence. At point 734 the remote unit 14 receives a command message. The second unique identifier contained in the command message is compared at point 736 with the previously stored second unique identifier of the lead unit 14 which was stored at point 714. If the comparison does not agree, the message is discarded at point 738. If the comparison does agree, the message is conveyed to the decoding section of the microprocessor control as indicated at point 740. At point 742 the remote unit 12 is now set in the link mode which indicates that the linking sequence is complete. At point 744 the remote unit formats an appropriate response to the command message and transmits a status or alarm message to the lead unit 14 which sent the message to the remote unit as indicated at point 732. At point 746 the lead unit 14 receives the status or alarm message which was transmitted by the remote unit at point 744. At point 746 a comparison is made between the second unique identifier contained in the status or alarm message transmitted by the remote unit 12 with the second unique identifier stored in the memory of the lead station 30. If the second unique identifiers agree, the lead unit proceeds with processing the received status or alarm message. Thereafter communications proceed between the lead and remote units.

H. Brake Pipe Continuity Test

Figure 13:
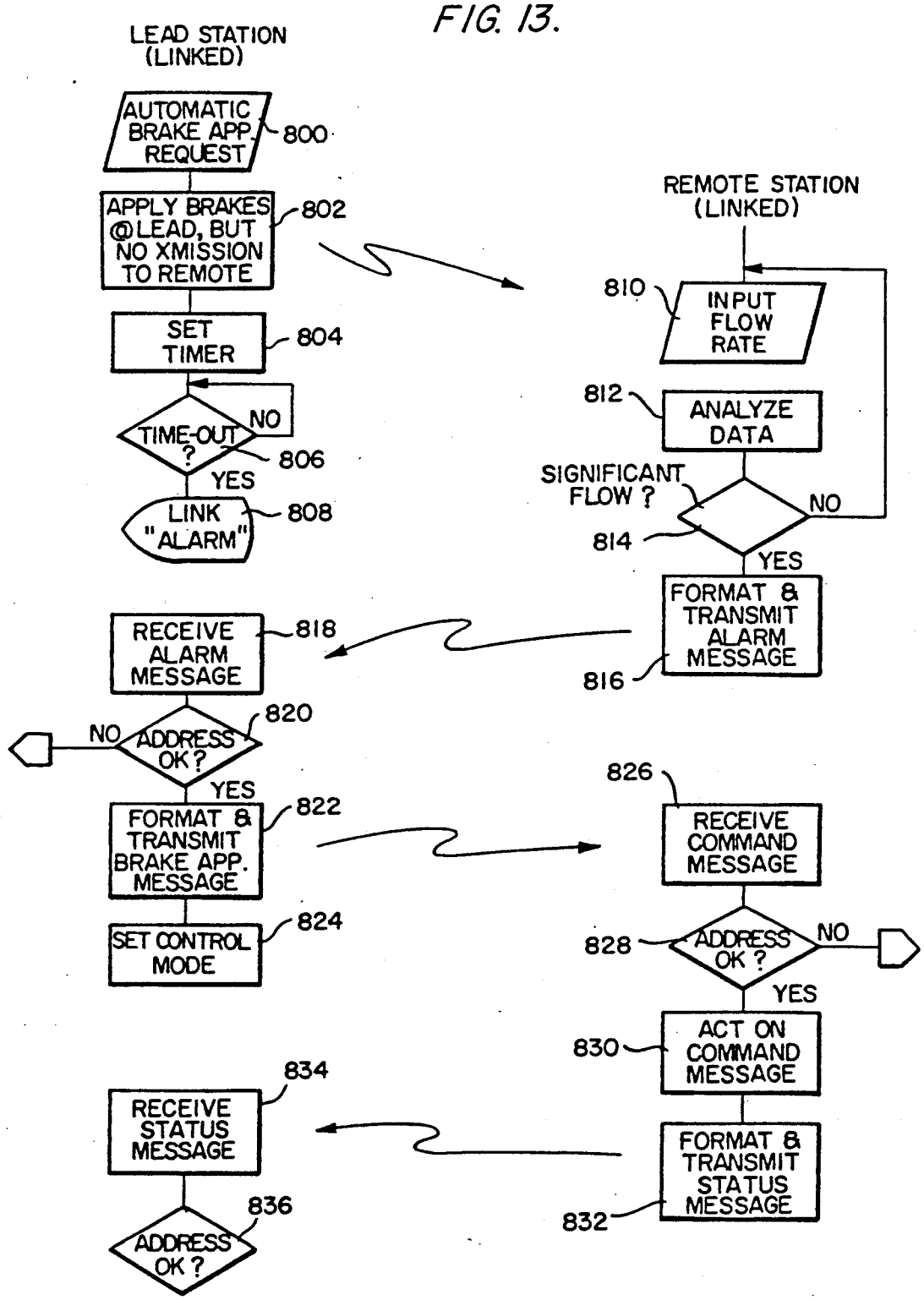
FIG. 13 is a flow chart of the sequence of communications which occur when the continuity of the brake pipe is checked.

FIG. 13 illustrates the brake pipe continuity test which is executed by the present invention to determine if the train air brakes are in condition for safe operation. At point 800, which occurs after linking, an automatic brake application request is made by the operator. At point 802 a signal is sent to the remote unit such as by the application of the automatic air brakes at the lead unit. But no transmission of the automatic brakes application is made by the lead station 30. This begins the continuity check sequence. Alternatively, other signals as, for example, air brake perturbation signals could be applied. A timer is set at point 804 which begins running at the time of application of the brakes at the lead unit 14. The timer continues to run at decision point 806. If the timer times out consequent from not receiving a radio communication from the remote units 12, a link alarm is activated on the unit console 34 at point 808. At the remote unit which has been previously linked, the flow rate input from the flow sensor of FIG. 6 is read at point 810. The sensed flow rate data is analyzied at point 812 by the remote station microprocessor. A decision is made at decision point 814 if a significant flow rate has been sensed in accordance with the criteria discussed above with reference to FIGS. 6 and 13. At point 816 an appropriate alarm message is formatted and transmitted to the lead unit 14 if a significant flow rate was detected.

At the lead unit the alarm message is received at point 818. If the analysis of the second unique identifier of the remote unit 12 is correct at point 820, the lead unit formats and transmits a brake application message at point 822 and proceeds into the control mode at point 824. In the control mode, the system is free to operate in any manner specified by the engineer in the lead unit 14. The remote unit 12 receives the command message formatted at point 822 at point 826. After a determination at point 828 that the second unique identifier contained in the message agrees with the stored second unique identifier, the remote unit acts on the command message at point 830. At point 832 the remote unit 12 transmits an appropriate status message to the lead unit 14. At point 834 the lead unit receives the status message and proceeds to analyze its address at point 836. Thereafter, the operation of the train proceeds under the control of the engineer in the lead unit 14 with the radio communication channel transmitting information between the lead and remote units 14 and 12.

VII. Communication Channel Contention

The communication system of the present invention minimizes interference on the same communication channel caused by stations within multiple trains and stations within the same train. Preferably, a combination of fixed and randomized time intervals measured from the end of the latest transmission are assigned for making the various types of communications in the system. The preferred system for determining transmission times for all types transmissions in the system is set forth below in table form. It should be understood that the priority system is not limited to the specific combination of fixed and randomized time intervals.

| Types of Communications | Time of Transmission Measured form End of Transmission of Latest Transmission — Time Transmissions Within Time Interval |
| --- | --- |
| I. Fixed priorities, fixed time intervals spaced at least 40 ms apart. These communications are the highest priority transmissions in the system. | 80–360 ms |
| Reply of remote #1 to command of lead unit. | (1) 80 ms |
| Reply of Remote #2 to command of lead unit. | (2) 120 ms |
| Operation of on board repeater in remote #1 | (1) 80 ms |
| Operation of off board | (3) 360 ms |
| II. High Priority Commands, 4 randomized intervals. Any command is assigned a randomized time period (m = 4) within the 400–520 ms time interval by a random number generator programmed in the station microprocessor counting from 1 to m. | 400–520 ms<br>(1) 400 ms<br>(2) 440 ms<br>(3) 480 ms<br>(4) 520 ms |
| High priority commands include:<br>1. Emergency Brake Application<br>2. Automatic Brake Application<br>3. Remote Station Initiated Communications Checks & Responses by Lead Station<br>4. Remote Station Alarms<br>5. Remote Status Change<br>6. Link/Unlink Messages | |
| III. Lead Locomotive Commands (except Automatic Brake Application and Emergency Brake Application), 8 randomized levels. Any command is | 560 ms–840 ms<br>(1) 560 ms<br>(2) 660 ms<br>(3) 640 ms<br>(4) 680 ms |

-continued

| Types of Communications | Time of Transmission Measured form End of Transmission of Latest Transmission | |
|---|---|---|
| | | Time Transmissions Within Time Interval |
| assigned a randomized time period (n = 8) within the 560-840 ms time interval by a random number generator programmed in the microprocessor counting from 1 to n. | | (5) 720 ms<br>(6) 760 ms<br>(7) 800 ms<br>(8) 840 ms |
| IV. Lead Locomotive Communications Checks, 8 randomized levels The lead unit communications check, which is broadcast after a period of sustained silence by any remote unit transceiver, is assigned a randomized time period (p = 8) within the 880-1160 ms time interval by a random number generator programmed in the microprocessor counting from 1 to p. | 880 ms-1160 ms | (1) 880 ms<br>(2) 920 ms<br>(3) 960 ms<br>(4) 1000 ms<br>(5) 1040 ms<br>(6) 1050 ms<br>(7) 1120 ms<br>(8) 1160 ms |
| V. Lead Locomotive Communications During a Period of Communication Interruption, 8 randomized levels A message from the lead unit during a period when a communication interruption has been detected consequent from sustained radio silence is assigned randomized time period (r = 8) within the 1200-1480 ms time interval by a random number generator programmed in the microprocessor counting from 1 to r. | 1200 ms-1480 ms | (1) 1200 ms<br>(2) 1240 ms<br>(3) 1280 ms<br>(4) 1320 ms<br>(5) 1360 ms<br>(6) 1400 ms<br>(7) 1440 ms<br>(8) 1480 ms |

The random time periods within the four categories of transmissions described above are generated in each station microprocessor by one random number generator counting between one and the number of time periods within the time interval during which individual transmissions can occur. The programming of a computer to generate a random number within a counting sequence is known. The count of the random number generator at the end of the latest transmission is used to calculate the transmission delay count based on the current status of the station. The delay begins immediately when a transmission is required to be made. If the timer is still running, the transmission is delayed. If the timer has run out, the transmission proceeds. For example, assuming that the system has a high priority command waiting for transmission, and the random number generator (counting between 1 and m) count for determining high priority commands is a 3 at the end of the latest transmission, an automatic brake application command (the high priority command) would be transmitted 480 ms after the end of the latest transmission was detected by the lead station regardless of whether that transmission was from a station within the same train 18 or from another train system within radio transmitting distance. Similarly all other stations within the various systems would have chosen random number values and transmission delay times at the end of the latest transmission. Each time a transmission occurs over the radio communication channel, the time intervals for determining transmission discussed above are restarted and the various number generators are set. Each station makes its transmission on a real time basis as soon as the condition warranting the transmission has occured and the requisite time interval of radio channel silence has elapsed from the latest transmission on the channel. The primary principle of operation of the channel contention system is that the first unit station to begin transmitting prevents the other stations from transmitting as a consequence of the above described transmission time determining system in which the time interval of radio channel silence is begun again.

While the preferred channel contention system utilizes fixed transmission times for transmissions of the highest priority, alternatively the highest priority transmissions may be assigned random time intervals by using a random number generator which counts from 1 to q. The assignment of the time of transmission for each remote unit reply and repeater transmission is controlled by the random number generator such that the times of transmission of each remote unit and the repeaters are assigned randomly to the 40 ms time intervals within the 30-360 ms time of transmission.

While the preferred form of the second unique identifier is the station serial number, it should be understood that the second unique identifiers may alternatively be generated by the microprocessor located at each lead and remote station by a random number generator in accordance with known programming principles. The randomly generated second unique identifier would be stored in the RAM of each station and used in the same manner described above.

While the foregoing invention has been described in terms of its preferred embodiments, it should be understood that various modifications may be made thereto without departing from the spirit and scope of the invention as defined in the appended claims. It is intended that all such modifications fall within the scope of the appended claims.

What is claimed is:

1. In a communication system for use with the control of a railroad train having a plurality of transceivers, the transceivers being located on lead and remote units of the train, a lead unit controlling the operation of a remote unit by way of a transmission which includes a command transmitted by a lead transceiver over a communication channel therebetween, a remote unit transmitting a reply to a command confirming execution of the command, and information representative of the operation of a remote unit, a system for controlling which unit transmits on the channel comprising:

at each respective unit, first means, associated with the transceiver of that unit, for detecting the ending of the latest transmission by any transceiver on the communication channel; and second means, coupled to said first means, for causing its associated transceiver to initiate a transmission upon the termination of the delay of a prescribed period of time after the detection of the ending of said latest transmission by said first means, and wherein each transmission over said communication channel is prioritized into one of a plurality of different ranges of time delay that must terminate before that transmission may be initiated, such that a higher priority transmission is initiated after a time delay that is shorter than any time delay within a range of time delays of a lower priority transmission.

2. A system according to claim 1, wherein, within a respective range of time delays into which a transmission is prioritized, the time delay that must expire before a transmission is initiated is randomly selected.

3. A system according to claim 2, further comprising:

a second repeater at a location other than on the train for receiving transmissions from a lead or remote unit and retransmitting such transmissions, said second repeater having a transceiver the initiation of transmission from which is prioritized into a range of time delay that follows the range of time delay into which retransmission of a message by the first repeater is prioritized.

4. A system according to claim 1, wherein a remote unit functions as a repeater for receiving a transmitted message from a lead unit and retransmitting that message, and wherein the time delay that must expire before the remote unit retransmits the message is the same as that for transmitting a reply to a transmission from the lead unit.

* * * * *